(12) United States Patent
Mullick et al.

(10) Patent No.: US 8,318,867 B2
(45) Date of Patent: *Nov. 27, 2012

(54) THERMALLY STABLE BIURET AND ISOCYANURATE BASED SURFACE MODIFYING MACROMOLECULES AND USES THEREOF

(75) Inventors: Sanjoy Mullick, Brampton (CA); Weilun Chang, Toronto (CA); Alexandra Piotrowicz, Toronto (CA); Jeannette Ho, Toronto (CA); Richard Witmeyer, Toronto (CA)

(73) Assignee: Interface Biologics, Inc., Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,427

(22) Filed: Dec. 12, 2011

(65) Prior Publication Data
US 2012/0148774 A1 Jun. 14, 2012

Related U.S. Application Data

(63) Continuation of application No. 13/060,542, filed as application No. PCT/US2009/055418 on Aug. 28, 2009.

(60) Provisional application No. 61/092,667, filed on Aug. 28, 2008.

(51) Int. Cl.
| | | |
|---|---|---|
| C08F 283/00 | (2006.01) | |
| C08F 283/06 | (2006.01) | |
| C08F 283/12 | (2006.01) | |
| C08G 18/42 | (2006.01) | |
| C08G 18/48 | (2006.01) | |
| C08G 18/61 | (2006.01) | |
| C08G 18/30 | (2006.01) | |
| C08G 18/79 | (2006.01) | |

(52) U.S. Cl. ............. 525/453; 525/460; 528/59; 528/83
(58) Field of Classification Search .................. 525/453, 525/460; 528/59, 83
See application file for complete search history.

(56) References Cited

U.S. PATENT DOCUMENTS

| | | | |
|---|---|---|---|
| 3,392,183 A | | 7/1968 | Windemuth et al. |
| 3,427,366 A | * | 2/1969 | Ryan et al. .................... 525/126 |
| 3,872,058 A | | 3/1975 | Gresham |
| 4,312,907 A | | 1/1982 | Hiraoka et al. |
| 4,584,362 A | | 4/1986 | Leckart et al. |
| 4,661,530 A | * | 4/1987 | Gogolewski et al. ......... 521/137 |
| 4,742,090 A | | 5/1988 | Hunter et al. |
| 4,788,083 A | | 11/1988 | Dammann et al. |

(Continued)

FOREIGN PATENT DOCUMENTS
CN 1894302 A 1/2007

(Continued)

OTHER PUBLICATIONS
U.S. Appl. No. 08/690,108, filed Jul. 31, 1996, Santerre et al.

(Continued)

*Primary Examiner* — Randy Gulakowski
*Assistant Examiner* — Mike M Dollinger
(74) *Attorney, Agent, or Firm* — Clark & Elbing LLP; Kristina Bieker-Brady

(57) ABSTRACT

The invention relates to surface modifying macromolecules (SMMs) having high degradation temperatures and their use in the manufacture of articles made from base polymers which require high temperature processing. The surface modifier is admixed with the base polymer to impart alcohol and water repellency properties.

28 Claims, 30 Drawing Sheets

U.S. PATENT DOCUMENTS

| | | | | |
|---|---|---|---|---|
| 4,792,354 | A | | 12/1988 | Matsuo et al. |
| 4,861,830 | A | | 8/1989 | Ward |
| 4,994,503 | A | * | 2/1991 | Harris et al. .................. 521/137 |
| 5,064,871 | A | | 11/1991 | Sciangola |
| 5,145,727 | A | | 9/1992 | Potts et al. |
| 5,149,576 | A | | 9/1992 | Potts et al. |
| 5,242,995 | A | | 9/1993 | Kim et al. |
| 5,395,525 | A | * | 3/1995 | Takano et al. ............ 210/321.89 |
| 5,486,570 | A | | 1/1996 | St. Clair |
| 5,543,200 | A | | 8/1996 | Hargis et al. |
| 5,589,563 | A | * | 12/1996 | Ward et al. ...................... 528/44 |
| 5,779,897 | A | * | 7/1998 | Kalthod et al. ............ 210/321.8 |
| 5,908,701 | A | | 6/1999 | Jennings et al. |
| 5,929,201 | A | | 7/1999 | Gibbons et al. |
| 6,111,049 | A | * | 8/2000 | Sendijarevic et al. .......... 528/65 |
| 6,127,485 | A | * | 10/2000 | Klun et al. .................... 525/199 |
| 6,127,507 | A | | 10/2000 | Santerre |
| 6,254,645 | B1 | | 7/2001 | Kellis, Jr. et al. |
| 6,353,057 | B1 | | 3/2002 | He et al. |
| 6,448,364 | B1 | | 9/2002 | Clatty et al. |
| 2004/0121175 | A1 | | 6/2004 | Flexman et al. |
| 2005/0176893 | A1 | | 8/2005 | Rana et al. |
| 2007/0037891 | A1 | | 2/2007 | Esfand et al. |
| 2008/0228253 | A1 | | 9/2008 | Mullick et al. |
| 2009/0211968 | A1 | | 8/2009 | Ho et al. |
| 2011/0009799 | A1 | | 1/2011 | Mullick et al. |
| 2011/0271961 | A1 | | 11/2011 | Mullick et al. |

FOREIGN PATENT DOCUMENTS

| | | |
|---|---|---|
| EP | 0 068 509 | 1/1983 |
| EP | 0 073 978 | 3/1983 |
| EP | 0 231 927 | 8/1987 |
| EP | 0 332 261 | 9/1989 |
| EP | 0 335 664 | 10/1989 |
| EP | 0 615 778 | 9/1994 |
| EP | 0 894 823 | 2/1999 |
| RU | 2215012 C2 * | 10/2003 |
| WO | WO 95/26993 | 10/1995 |
| WO | WO 97/06195 | 2/1997 |
| WO | WO 98/34718 | 8/1998 |
| WO | WO 2004/056459 | 7/2004 |
| WO | WO 2007/084514 | 7/2007 |
| WO | WO 2008/076345 | 6/2008 |
| WO | WO 2011/072398 | 6/2011 |

OTHER PUBLICATIONS

BioInterface 2011 Conference Agenda (available at sib.affiniscape.com/cde.cfm?event=331217& addEventId=331217), with text of abstracts from presentations by Cai, "Carboxyl-Ebselen-Based Layer-by-Layer Film: A Potential Antithrombotic and Antimicrobial Coating" (Oct. 25, 2011); Cook, "Surface Modifications with Improved Long-Term Hemocompatability" (Oct. 25, 2011); Dirks, "Non-Adhesive and Antimicrobial Coatings for Medical Implants" (Oct. 26, 2011); and Strokowski, "Adsorption and Hemocompatibility Properties of Elastin-like Polypeptide Surfaces" (Oct. 25, 2011).

Engelberg et al., "Physico-Mechanical Properties of Degradable Polymers Used in Medical Applications: A Comparative Study," *Biomaterials*, 12: 292-304 (1991).

Goldberg, "Elastomeric Polycarbonate Block Copolymers," *Journal of Polymer Science: Part C*, 4: 707-730 (1963).

Jin et al., "Thermotropic Liquid Crystalline Polyesters With Rigid or Flexible Spacer Groups," *The British Polymer Journal*. 132-146 (1980).

Kakimoto et al., "Preparation and Properties of Fluorine-Containing Polyarylates From Tetrafluoroisophthaloyl Chloride and Bisphenols," *Journal of Polymer Science: Part A: Polymer Chemistry*, 25: 2747-2753 (1987).

Kulesza et al., "Thermal Decomposition of Bisphenol A-Based Polyetherurethanes Blown With Pentane Part I-Thermal and Pyrolytical Studies," *J. Anal. Appl. Pyrolysis*, 76: 243-248 (2006).

La Mantia et al., "Thermo-Mechanical Degradation of Polymer Blends," *Die Angewandte Makromolekulare Chemie*, 216: 45-65 (1994).

Liaw et al., "Curing Kinetics of Epoxy Resins Based on Bisphenol-S and its Derivatives," *Die Angewandte Makromolekulare Chemie*, 200: 137-146 (1992).

Liaw et al., "Synthesis of Epoxy Resins Based on Bisphenol-S and its Derivatives," *Die Angewandte Makromolekulare Chemie*, 199: 171-190 (1992).

Liaw et al., "Radical Polymerization of Mono- and Di-Methacrylic Esters Containing Bisphenol-S," *Die Angewandte Makromolekulare Chemie*, 207: 43-52 (1993).

Liaw et al., "Curing of Acrylated Epoxy Resin Based on Bisphenol-S," *Polymer Engineering and Science*, 34(16): 1297-1303 (1994).

Liaw, "The Relative Physical and Thermal Properties of Polyurethane Elastomers: Effect of Chain Extenders of Bisphenols, Diisocyanate, and Polyol Structures," *Journal of Applied Polymer Science*, 66: 1251-1265 (1997).

Marks, "Interfacial Synthesis and Characterization of Random and Segmented Block Bisphenol A-Tetrabromobisphenol A Copolycarbonates," *Journal of Applied Polymer Science*, 52: 467-481 (1994).

Maruyama et al., "Synthesis and Properties of Polyarylates From 2,2-Bis(4-hydroxyphenyl)-1,1,1,3,3,3-Hexafluoropropane and Aromatic Diacid Chlorides," *Journal of Polymer Science: Part A: Polymer Chemistry*, 24: 3555-3558 (1986).

Maruyama et al., "Synthesis and Properties of Fluorine-Containing Aromatic Polybenzoxazoles from Bis(o-aminophenols) and Aromatic Diacid Chlorides by the Silylation Method," *Macromolecules*, 21(8): 2305-2309 (1988).

Mitsui NOTIO™ Nano-crystal Structure Controlled Elastomer (available at www.mitsuichemicals.com/notio.htm#).

Nagata et al., "Synthesis and Properties of Polyamides Derived from Systematically Halogenated Terephthalic Acids with Fluorine, Chlorine, or Bromine Atoms," *Journal of Polymer Science: Part A: Polymer Chemistry*, 26: 235-245 (1988).

Shimizu et al., "Synthesis and Characterization of Fluorine-Containing Aromatic Polyethers From Tetrafluoroisophthalonitrile and Bisphenols," *Journal of Polymer Science: Part A: Polymer Chemistry*, 25: 2385-2393 (1987).

Sukumar et al., "Synthesis and Thermal Studies of Block Copolymers from NR and MDI-Based Polyurethanes," *Journal of Applied Polymer Science*, 111: 19-28 (2009).

Suk et al., "Study on the Kinetics of Surface Migration of Surface Modifying Macromolecules in Membrane Preparation," *Macromolecules* 35:3017-3021, 2002.

Tang et al., "Synthesis of Surface Modifying Macromoleculestor Use in Segmented Polyurethanes," *J. Appl. Polym. Sci.* 62: 1133-1145 (1996).

Tang et al., "Use of Surface-Modifying Molecules to Enhance the Biostability of Segmented Polyurethanes," *J. Biomed. Mat. Res.* 35:371-381 (1997).

Examination Report issued for European Patent Application No. 96 925 626.2-2115, dated Dec. 15, 1998.

Examination Report issued for European Patent Application No. 96 925 626.2-2115, dated Apr. 30, 1999.

Examination Report issued for European Patent Application No. 96 925 626.2-2115, dated Feb. 17, 2000.

Extended European Search Report from European Patent Application No. 07862900.3, dated Jul. 27, 2010.

Examination Report issued for European Patent Application No. 07862900.3, dated Jun. 20, 2011.

European Search Report issued for European Patent Application No. 10014044, dated Jan. 26, 2011.

International Search Report and Written Opinion (PCT/US 07/25577) mailed Apr. 17, 2008.

International Preliminary Report on Patentability for PCT/US07/25577 issued Jun. 16, 2009.

International Preliminary Report on Patentability (PCT/US2009/055418), dated Mar. 1, 2011.

International Search Report (PCT/US2009/055418), dated Oct. 20, 2009.

Written Opinion of the International Searching Authority (PCT/US2009/055418), dated Oct. 20, 2009.

Office Action pertaining to U.S. Appl. No. 08/690,108, mailed Oct. 31, 1997.

Office Action pertaining to U.S. Appl. No. 08/690,108, mailed Apr. 24, 1998.
Office Action pertaining to U.S. Appl. No. 09/198,268, mailed May 12, 1999.
Office Action pertaining to U.S. Appl. No. 09/198,268, mailed Jan. 21, 2000.
Office Action pertaining to U.S. Appl. No. 12/002,226, dated Jan. 26, 2010.
Office Action pertaining to U.S. Appl. No. 12/002,226, dated Oct. 5, 2010.
Office Action pertaining to U.S. Appl. No. 13/060,542 dated Jul. 5, 2012.
Office Action in corresponding Chinese Application No. 200980142812.7, mailed Jul. 4, 2012.

* cited by examiner

SMM1

SMM2

Figure caption: PTMO124LD-G

SMM3

SMM4

SMM5

2HLB124LD-G

SMM6

SMM7

SMM8

Figure caption: 2H-HTPI124LD-E

SMM9

SMM10

PTMO1246-E

SMM11

SMM12

Fig. 11 caption area labels: PHCN1246-E; Fluoroalcohol; Soft Segment PHCN - Poly(hexamethylene Carbonate)diol; Desmodur Z-4470A IPDI Trimer Isocyanurate - hard segment

SMM13

SMM14

FIG. 9A

| # | Properties Endexo-3 SMM | Appearance | Theo MW | % F, EA | TGA, Hi-Res, N$_2$,°C (%wt loss) [a] Td$_1$ [b] Td$_2$ [c] | XPS 20° PP [d] 2% Heat Press | XPS 20° Si [e] 0.50% Solv.cast | XPS 20° PU [f] 1% Solv. cast | XPS 90° PVC [g] 4% Extrud. | Wt% Hard Segment | Wt% Soft Segment | Wt% End Groups |
|---|---|---|---|---|---|---|---|---|---|---|---|---|
| 1 | PTMO1248-F SMM1 | Waxy Semi-solid off white | 3545 | 23.29 | 250 (1.27) 344 (56.25) | 11 | 46 | 51 | 32.4 | 31.18 | 27.73 | 41.09 |
| 2 | PTMO124LD-G SMM2 | Waxy solid off white | 3814 | 33.20 | 285 (1) 397 (61) | 20 | 35 | 49 | 41.27 | 30.59 | 25.78 | 43.63 |
| 3 | 2HLB124LD-E SMM3 | Rubbery solid off white | 5536 | 20.52 | 296 (1.1) 405 (55.31) | 12 | 0.4 | 35 | 26.37 | 26.07 | 43.87 | 30.06 |
| 4 | 2HLB124LD-F SMM4 | Rubbery solid amber | 5198 | 19.04 | 251 426 (44) | 9 | 18 | 31 | --- | 21.26 | 46.72 | 32.01 |
| 5 | 2HLB124LD-G SMM5 | Rubbery solid off white | 5259 | 20.63 | 306 (1.34) 433 (37.82) | 16 | 13 | 41 | 34.54 | 22.18 | 46.18 | 31.64 |
| 6 | PCN124LD-E SMM6 | White crys. solid | 4075 | 31.92 | 286 (4.47) 338 (55.68) | 2 | 1 | 33 | 22.31 | 35.42 | 23.74 | 40.84 |
| 7 | PDP124LD-E SMM7 | White cryst. solid | 5083 | 19.29 | 296 (2.29) 365 (31) | 9 | 4 | 33 | 18.12 | 28.4 | 38.86 | 32.74 |

FIG. 9B

| # | Properties Endexo-3 SMM | Appearance | Theo MW | % F, EA | TGA, Hi-Res, $N_2$, °C (%wt loss)[a] $Td_1$[b] $Td_2$[c] | XPS 20° PP[d] 2% Heat Press | XPS 20° Si[e] 0.50% Solv.cast | XPS 20° PU[f] 1% Solv. cast | XPS 90° PVC[g] 4% Extrud. | Wt% Hard Segment | Wt% Soft Segment | Wt% End Groups |
|---|---|---|---|---|---|---|---|---|---|---|---|---|
| 8 | HHTPI124LD-E SMM8 | White rubbery solid | 5227 | 20.34 | 290 (0.46) 416 (57) | 5 | 0.2 | 35 | 25.38 | 27.61 | 40.55 | 31.84 |
| 9 | C22-1248-F SMM9 | Viscous off white semi-solid | 5562 | 15.94 | 225 (1.4) 336 (45) | --- | 41[i] | --- | --- | 19.87 | 53.94 | 26.19 |
| 10 | PTMO1246-E SMM10 | Glassy Solid off white | 3870 | 24.00 | 293 (1.30) 347 (37.70) | --- | --- | --- | --- | 37.01 | 25.64 | 37.35 |
| 11 | PLN1246-E SMM11 | Gummy Solid colorless | 4800 | 24.00 | 294 (2.80) 339 (40.16) | --- | --- | --- | --- | 30.07 | 39.59 | 30.34 |
| 12 | PHCN1246-E SMM12 | Glassy Solid colorless | 4861 | 23.00 | 295 (2.24) 333 (36.52) | --- | --- | --- | --- | 26.69 | 40.35 | 29.96 |
| 13 | PEGA1246-E SMM13 | Glassy Solid off white | 5450 | 19.00 | 295 (1.74) 354 (27.84) | --- | --- | --- | --- | 26.48 | 46.79 | 26.72 |
| 14 | DDD1246-E SMM14 | White cryst.solid | 3102 | 31.00 | 284 (1.54) 344 (51.46) | --- | --- | --- | --- | 46.53 | 6.52 | 46.95 |

FIG. 9C

LEGEND a  Hi-Res Thermal Gravimeteric Analysis under $N_2$
b  Degradation Temperature Td1 (°C), from first onset, usually represents fluoro-end groups and hard segment
c  Degradation Temperature Td2 (°C), from second onset, usually represents the soft segment
d  % Surface Fuorination of Endexo™ 3 SMM modified PP (Polypropylene) at 2 % incorporation, polymer films were made by heat pressing.
e  % Surface Fuorination of Endexo™ 3 SMM modified SI (Siloxane) at 0.5 % incorporation. Polymer filmswere made by solution casting
f  % Surface Fuorination of Endexo™ 3 SMM modified PU (Polyurethanes) at 1.0 % incorporation. Polymer films were made by solution casting
g  % Surface Fuorination of Endexo™ 3 SMM modified PVC (Polyvinyl Chlorine) at 4 % incorporation. Polymer rods were made by mixing and extruding in a microextruder
i  % Surface Fuorination of Endexo™ 3 SMM modified Si (Siloxane) at 2 % incorporation. Polymer films were made by solution casting.

70% IPA Solution Drop on MB Fabric:

Control MB          SMM MB
(after sterilization)

THERMALLY STABLE BIURET AND ISOCYANURATE BASED SURFACE MODIFYING MACROMOLECULES AND USES THEREOF

CROSS-REFERENCE TO RELATED APPLICATIONS

This application is a continuation of U.S. patent application Ser. No. 13/060,542, filed Feb. 24, 2011, with a 371(c) date of May 5, 2011, which is the U.S. National Stage of International Application No. PCT/US2009/055418, filed Aug. 28, 2009, which claims benefit from U.S. Provisional Application No. 61/092,667, filed Aug. 28, 2008, each of which is hereby incorporated by reference in its entirety.

BACKGROUND OF THE INVENTION

The invention relates to surface modifying macromolecules (SMMs) having high degradation temperatures and their use in the manufacture of articles made from base polymers which require high temperature processing.

Various fluorochemicals have been used to impart water and oil repellency, as well as soil resistance, to a variety of substrates. These fluorochemicals have most often been applied topically (for example, by spraying, padding, or finish bath immersion). The resulting repellent substrates have found use in numerous applications where water and/or oil repellency (as well as soil resistance) characteristics are valued, such as in protective garments for medical technicians and laboratory workers. The repellent substrates can be used, for example, where it is desirable to prevent passage of blood, blood-borne pathogens, and other body fluids across the fabric (i.e., to block exposure to chemically toxic or infectious agents), and to reduce exposure to low surface tension chemicals, such as alcohols, ketones, and aldehydes.

Medical care garments and protective wear garments used commercially are often fully or partially constructed of extruded articles (e.g., thermoplastic films, thermoplastic fibers, fibrous non-woven materials, thermoplastic foam materials, etc.). Examples of these products are in surgical drapes, gowns and bandages, and protective wear garments (e.g., workers overalls, facemasks, and labcoats, among others). These materials require high temperature processing conditions often exceeding 200° C.

Many fluorochemicals lack the requisite thermal stability to be processed at temperatures above 200° C. (for example, in melt spun applications where high extrusion temperatures often exceeding 275-300° C. are involved).

Thus, there remains a need for thermally s' additives which can be used in admixture with base polymers that require high temperature processing to impart water, oil repellency, and/or lower surface energy.

SUMMARY OF THE INVENTION

The invention provides surface modifying macromolecule (SMM or surface modifier) additives having high degradation temperatures. These SMMs are useful in the manufacture of articles made from base polymers which require high temperature processing.

Accordingly, in a first aspect the invention features a surface modifier of formula (I):

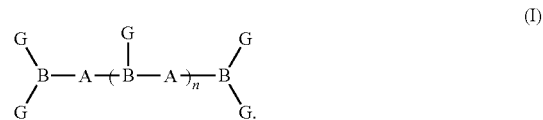

In formula (I), A is a soft segment including hydrogenated polybutadiene, poly(2,2 dimethyl-1-3-propylcarbonate), polybutadiene, poly(diethylene glycol)adipate, diethylene glycol-ortho phthalic anhydride polyester, poly (hexamethyhlenecarbonate)diol, hydroxyl terminated polydimethylsiloxanes (PrO-PDMS-PrO) block copolymer, poly(tetramethyleneoxide)diol, hydrogenated-hydroxyl terminated polyisoprene, poly(ethyleneglycol)-block-poly(propyleneglycol))-block-poly(ethylene glycol), 1,12-dodecanediol, poly(hexamethylene carbonate), poly(ethylene-co-butylene), 1,6-hexanediol-ortho phthalic anhydride polyester, neopentyl glycol-ortho phthalic anhydride polyester, or bisphenol A ethoxylate; or 1,6-hexanediol-ortho phthalic anhydride polyester; B is a hard segment including a urethane trimer or biuret trimer; G is a surface active group; and n is an integer from 0 to 10 (e.g., 0, 1, 2, 3, 4, 5, 6, 7, 8, 9, or 10).

Surface modifiers of formula (I) can have a thermal degradation temperature of at least 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, or even 350° C. In certain embodiments, the surface modifier has a thermal degradation temperature of between 200 and 250° C., 220 and 250° C., 220 and 300° C., 220 and 280° C., 220 and 260° C., 240 and 300° C., 240 and 280° C., 240 and 260° C., 260 and 300° C., 260 and 280° C., 200 and 345° C., 220 and 345° C., 250 and 345° C., 275 and 345° C., 300 and 450° C., 320 and 450° C., 340 and 450° C., 360 and 450° C., 380 and 450° C., 400 and 450° C., 420 and 450° C., 300 and 430° C., 300 and 410° C., 300 and 400° C., 300 and 380° C., 300 and 360° C., 300 and 340° C., and 300 and 320° C.

In certain embodiments, the soft segment has a number average molecular weight ($M_n$) of 500 to 3,500 Daltons. In some embodiments, $M_n$ is between 500 to 1000, 500 to 1250, 500 to 1500, 500 to 1750, 500 to 2000, 500 to 2250, 500 to 2500, 500 to 2750, 500 to 3000, 500 to 3250, 1000 to 1250, 1000 to 1500, 1000 to 1750, 1000 to 2000, 1000 to 2250, 1000 to 2500, 1000 to 2750, 1000 to 3000, 1000 to 3250, 1000 to 3500, 1500 to 1750, 1500 to 2000, 1500 to 2250, 1500 to 2500, 1500 to 2750, 1500 to 3000, 1500 to 3250, or 1500 to 3500 Daltons. In still other embodiments, the surface active group has a molecular weight of between 100-1,500 Daltons. In still other embodiments, the surface active group has a molecular weight of between 100-1,500,100-1,400,100-1, 300,100-1,200, 100-1,100,100-1,000,100-900, 100-900, 100-800, 100-700, 100-600, 100-500, 100-400, 100-300, or 100-200 Daltons.

Surface active groups include, without limitation, polydimethylsiloxanes, hydrocarbons, polyfluoroalkyl, fluorinated polyethers, and combinations thereof. Desirably, the surface active group is a polyfluoroalkyl, such as 1H,1H,2H, 2H-perfluoro-1-decanol (($CF_3$)($CF_2$)$_7$$CH_2$$CH_2$OH); 1H,1H, 2H,2H-perfluoro-1-octanol (($CF_3$)($CF_2$)$_5$$CH_2$$CH_2$OH); 1H,1H,5H-perfluoro-1-pentanol ($CHF_2$($CF_2$)$_3$$CH_2$OH); and 1H,1H, perfluoro-1-butanol (($CF_3$)($CF_2$)$_2$$CH_2$OH), or mixtures thereof (e.g., mixtures of ($CF_3$)($CF_2$)$_7$$CH_2$$CH_2$OH and ($CF_3$)($CF_2$)$_5CH_2CH_2OH$), or a radical of the general formulas $CF_3(CF_2)_rCH_2CH_2$— wherein r is 2-20, and $CF_3(CF_2)_s(CH_2CH_2O)_\chi$— wherein $\chi$ is 1-10 (e.g., 1, 2, 3, 4, 5, 6, 7, 8, 9, or 10) and s is 1-20 (e.g., 1, 2, 3, 4, 5, 6, 7, 8, 9, 10, 11, 12, 13, 14, 15, 16, 17, 18, 19, or 20).

In certain embodiments, n is an integer from 0-5 (e.g., 0, 1, 2, 3, 4, or 5). Desirably, n is 0, 1, or 2.

The surface modifiers of the invention can have a theoretical molecular weight of less than 25 kDa, desirably less than 20 kDa, 18 kDa, 16 kDa, 15 kDa, 14 kDa, 13 kDa, 12 kDa, 11 kDa, 10 kDa, 8 kDa, 6 kDa, or even 4 kDa. In other embodiments, the surface modifiers of the invention have a theoretical molecular weight of 9 kDa, 8.5 kDa, 7.5 kDa, 7 kDa, 6.5 kDa, 5.5 kDa, 5 kDa, 4.5 kDa, 3.5 kDa, 3 kDa, 2.5 kDa, 2 kDa, 1.5 kDa or 1 kDa.

The surface modifiers of the invention can include from 5% to 35%, 10% to 35%, 5 to 30%, 10 to 30%, 5 to 20%, 5 to 15%, or 15 to 30% (w/w) of the hard segment; from 40 to 90%, 50 to 90%, 60 to 90%, 40 to 80%, or 40 to 70% (w/w) of the soft segment; and from 25 to 55%, 25 to 50%, 25 to 45%,25 to 40%, 25 to 35%, 25 to 30%, 30 to 55%, 30 to 50%, 30 to 45%, 30 to 40%, 30 to 35%, 35 to 55%, 35 to 50%, 35 to 45%, 35 to 40%, 40 to 55%, 40 to 50%, 40 to 45%, 45 to 55%, 45 to 50%, or 50-55% (w/w) of the surface active group.

The invention also features an admixture including a surface modifier of the invention admixed with a base polymer. In certain embodiments, the base polymer is selected from polypropylenes, polyethylenes, polyesters, polyurethanes, nylons, polysilicones, polystyrenes, poly(methyl methacrylates), polyvinylacetates, polycarbonates, poly(acrylonitrile-butadiene)s, polyvinylchloride, and blends thereof. For example, SMMs including hydrogenated polybutadiene can be admixed with polypropylenes or polyethylenes, SMMs including poly(2,2 dimethyl-1-3-propylcarbonate) can be admixed with polyurethanes, and SMMs including poly(ethylene-co-butylene) can be admixed with polyethylenes or polyurethanes.

The admixtures can be prepared by (i) combining the base polymer and the surface modifier to form a mixture, and (ii) heating the mixture above 200° C., 220° C., 250° C., 270° C., 300° C., 320° C. or 350° C. The admixtures of the invention contain from 0.05% to 20%, 0.05% to 15%, 0.05% to 13%, 0.05% to 10%, 0.05% to 5%, 0.05% to 3%, 0.5% to 15%, 0.5% to 10%, 0.5% to 6%, 0.5% to 4%, 1% to 15%, 1% to 10%, 1% to 8%, 1% to 6%, 1% to 5%, 2% to 5%, or 4% to 8% (w/w) surface modifier.

The invention further features an article formed from an admixture of the invention. Articles that can be formed using the admixtures of the invention include, without limitation, surgical caps, surgical sheets, surgical covering clothes, surgical gowns, masks, gloves, surgical drapes, filter (e.g., part of a respirator, water filter, air filter, or face mask), cables, films, panels, pipes, fibers, sheets, and implantable medical device (e.g., a cardiac-assist device, a catheter, a stent, a prosthetic implant, an artificial sphincter, or a drug delivery device).

The invention also features a method for making an article by (i) combining a base polymer with a surface modifier of the invention to form a mixture, and (ii) heating the mixture to at least 150° C. Desirably, the mixture is heated to a temperature of between 250° C. and 450° C.

The invention further features a method for increasing the thermal degradation temperature of a surface modifier of formula (I):

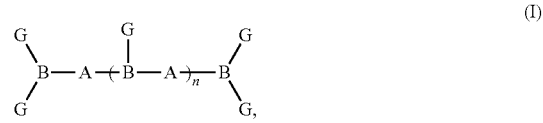

(I)

where A is a soft segment; B is a hard segment including a urethane trimer or biuret trimer; each G is a surface active group, n is an integer between 0-10, and
where the method includes the steps of:
(a) reacting a urethane trimer or biuret trimer with a monohydroxylic surface active group; and
(b) reacting the product of (a) with a soft segment;
where step (a) or (b) is performed in the presence of a bismuth (e.g, a bismuth carboxylate) catalyst.

In certain embodiments the diol soft segment is selected from hydrogenated-hydroxyl terminated polybutadiene, poly (2,2 dimethyl-1-3-propylcarbonate)diol, poly(hexamethylene carbonate)diol, poly(ethylene-co-butylene)diol, hydroxyl terminated polybutadiene polyol, poly(diethylene glycol)adipate, poly(tetramethylene oxide)diol, diethylene glycol-ortho phthalic anhydride polyester polyol, 1,6-hexanediol-ortho phthalic anhydride polyester polyol, neopentyl glycol-ortho phthalic anhydride polyester polyol, and bisphenol A ethoxylate diol. In certain embodiments, step (a) includes reacting a diisocyanate with hydrogenated-hydroxyl terminated polybutadiene or poly(2,2 dimethyl-1-3-propylcarbonate)diol. In other embodiments, the diisocyanate is selected from 3-isocyanatomethyl, 3,5,5-trimethyl cyclohexylisocyanate; 4,4'-methylene bis(cyclohexyl isocyanate); 4,4'-methylene bis(phenyl) isocyanate; toluene-2,4 diisocyanate); and hexamethylene diisocyanate. Monohydroxylic surface active groups useful in making the SMMs of the invention include any disclosed herein. In certain embodiments the monohydroxylic surface active group is selected from compounds of the general formula $CF_3(CF_2)_rCH_2CH_2OH$ wherein r is 2-20, and $CF_3(CF_2)_s(CH_2CH_2O)_\chi CH_2CH_2OH$ wherein $\chi$ is 1-10 (e.g., 1, 2, 3, 4, 5, 6, 7, 8, 9, or 10) and s is 1-20 (e.g., 1, 2, 3, 4, 5, 6, 7, 8, 9, 10, 11, 12, 13, 14, 15, 16, 17, 18, 19, or 20).

The invention also features a surface modifier of formula (II):

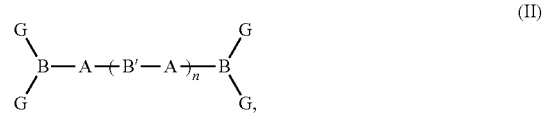

(II)

where A is a soft segment; B is a hard segment including a urethane trimer or biuret trimer; B' is a hard segment including a urethane; and each G is a surface active group; and where n is an integer between 0 to 10 (e.g., 1, 2, 3, 4, 5, 6, 7, 8, 9, or 10) and the surface modifier has a thermal degradation temperature of between 250° C. and 450° C. Surface modifiers of formula (II) can have a thermal degradation temperature of at least 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, or even 350° C. In certain embodiments, the surface modifier has a thermal degradation temperature of between 200 and 250° C., 220 and 250° C., 220 and 300° C., 220 and 280° C., 220 and 260° C., 240 and 300° C., 240 and 280° C., 240 and 260° C., 260 and 300° C., 260 and 280° C., 200 and 345° C., 220 and 345° C., 250 and 345° C., 275 and 345° C., 300 and 450° C., 320 and 450° C., 340 and 450° C., 360 and 450° C., 380 and 450° C., 400 and 450° C., 420 and 450° C., 300 and 430° C., 300 and 410° C., 300 and 400° C., 300 and 380° C., 300 and 360° C., 300 and 340° C., and 300 and 320° C.

Surface modifiers of Formula (II) can be used in any of the methods, articles, and admixtures of the invention.

The invention also features a method of increasing repellency by annealing a surface modifier with a base polymer where the annealing temperature is between 50° C. and 75° C. and the annealing time is between 1-24 hours.

In some embodiments, the surface modifier has the following structure

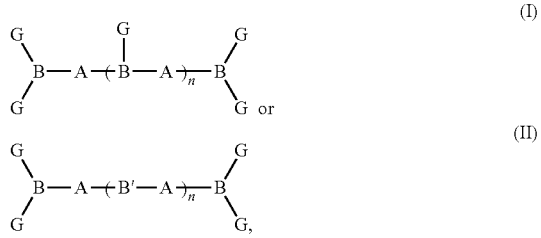

where A is a soft segment; B is a hard segment including a urethane trimer or biuret trimer; B' is a hard segment including a urethane; each G is a surface active group; n is an integer between 0 to 10 (e.g., 1, 2, 3, 4, 5, 6, 7, 8, 9, or 10) and the surface modifier has a thermal degradation temperature of between 250° C. and 450° C. In certain embodiments, the surface modifier has a thermal degradation temperature of between 200 and 250° C., 220 and 250° C., 220 and 300° C., 220 and 280° C., 220 and 260° C., 240 and 300° C., 240 and 280° C., 240 and 260° C., 260 and 300° C., 260 and 280° C., 200 and 345° C., 220 and 345° C., 250 and 345° C., 275 and 345° C., 300 and 450° C., 320 and 450° C., 340 and 450° C., 360 and 450° C., 380 and 450° C., 400 and 450° C., 420 and 450° C., 300 and 430° C., 300 and 410° C., 300 and 400° C., 300 and 380° C., 300 and 360° C., 300 and 340° C., and 300 and 320° C.

In some embodiments, the annealing temperature is 50° C., 51° C., 52° C., 53° C., 54° C., 54.4° C., 55° C., 56° C., 57° C., 58° C., 59° C., 60° C., 61° C., 62° C., 63° C., 64° C., 65° C., 70° C., or 75° C. In other embodiments, the annealing time is 1, 2, 3, 4, 5, 6, 7, 8, 9, 10, 11, or 12 hours.

As used herein, "surface modifier" refers to the compounds described herein or in U.S. Pat. No. 6,127,507 or in U.S. patent application Ser. No. 12/002,226, each of which is herein incorporated by reference. A surface modifier can also be described as a relatively low molecular weight polymer or oligomer containing a central portion of less than 20 kDa and covalently attached to at least one surface active group. The low molecular weight of the surface modifier allows for diffusion among the macromolecular polymer chains of a base polymer.

By "surface active group" is meant a lipophilic group covalently tethered to a surface modifier. The surface active group can be positioned to cap one or both termini of the central polymeric portion of the surface modifier or can be attached to one or more side chains present in the central polymeric portion of the surface modifier. Examples of surface active groups include, without limitation, polydimethylsiloxanes, hydrocarbons, polyfluoroalkyl, fluorinated polyethers, and combinations thereof.

As used herein, the term "thermal degradation temperature" refers to the temperature at which there is an onset of weight loss (a first onset representing a small weight loss, followed by a second onset at a considerably higher temperature representing the major fraction of the weight) of the SMM during thermographic analysis.

The thermal stability of the SMMs have also been tested under rigorous heating conditions e.g. 220, 260 and 300° C. for 10 and 25 minutes and the corresponding weight losses have been determined at these temperatures. These are typical temperatures experienced by polymers during processing at conditions that require high temperatures. The prolonged heating times of 10 and 25 minutes under isothermal conditions are rather harsh where in reality the polymers would only experience shorter residence time during actual processing (e.g., <5 minutes). Additionally, the prolonged heating times are to test the integrity of these surface modifiers and gauge the extent of degradation through the weight losses occurring at 10 and 25 minutes. This analysis is described in Example 1.

Other features and advantages of the invention will be apparent from the Drawings, Detailed Description, and the claims.

BRIEF DESCRIPTION OF THE DRAWINGS

FIGS. 9A, 9B, and 9C show thermal data and polymer characterization data, including TGA and EA results, for SMM1-SMM14.

DETAILED DESCRIPTION

Figure 1A:
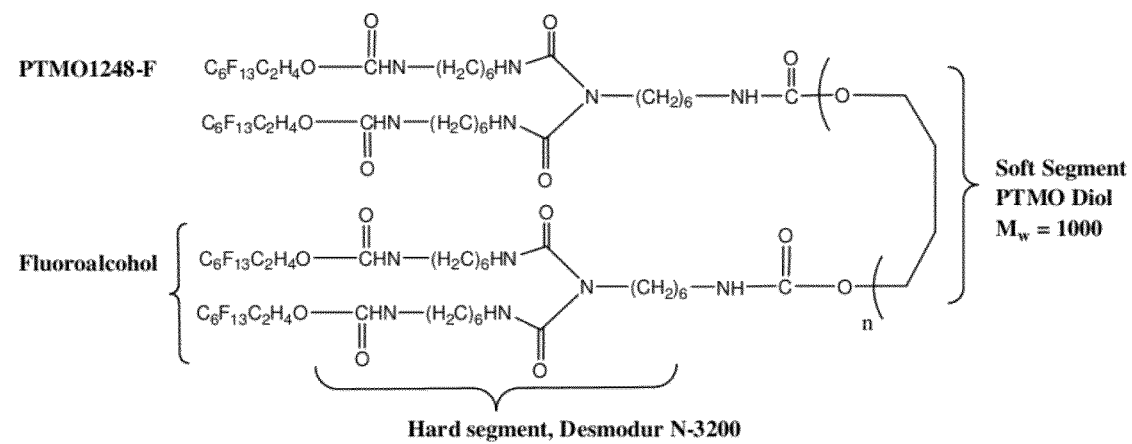
FIGS. 1a-1n show the chemical structures of SMM1-SMM14.
Figure 1B:
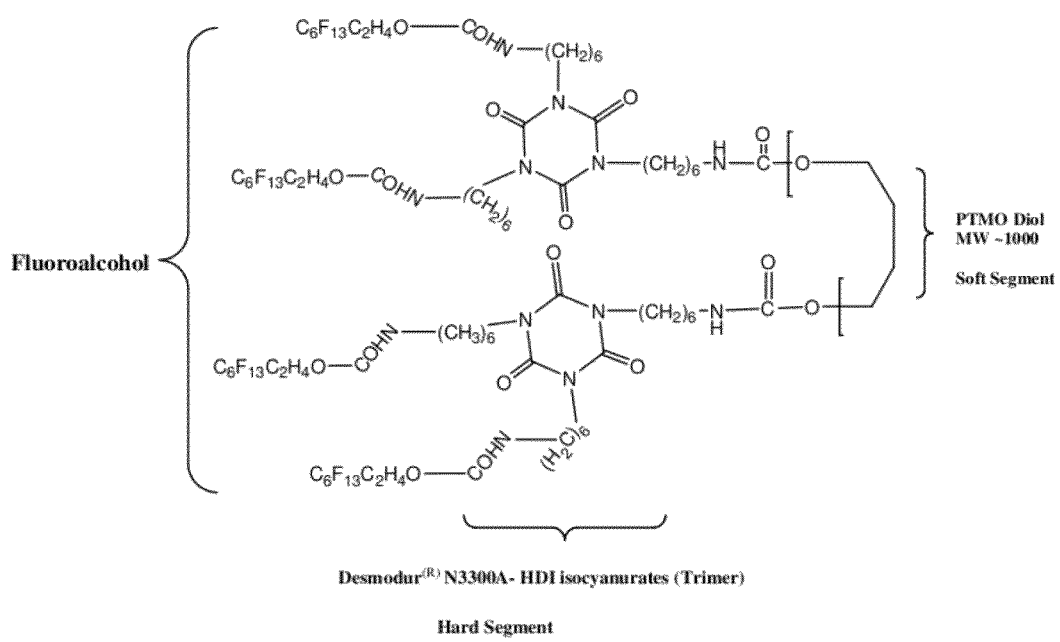
Figure 1C:
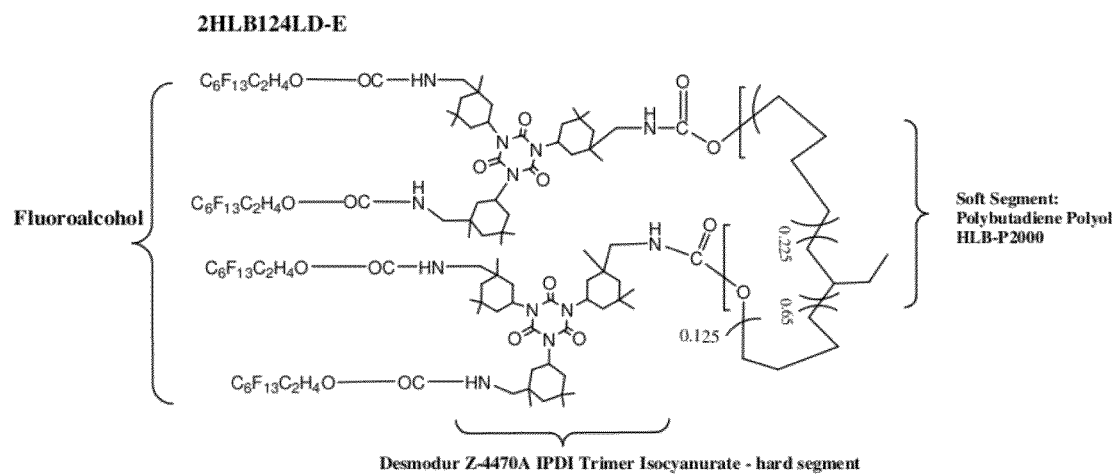
Figure 1D:
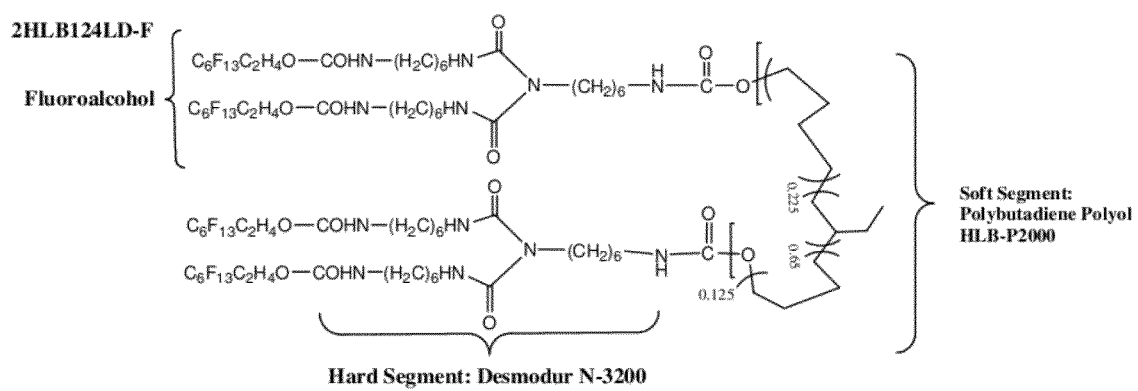
Figure 1E:
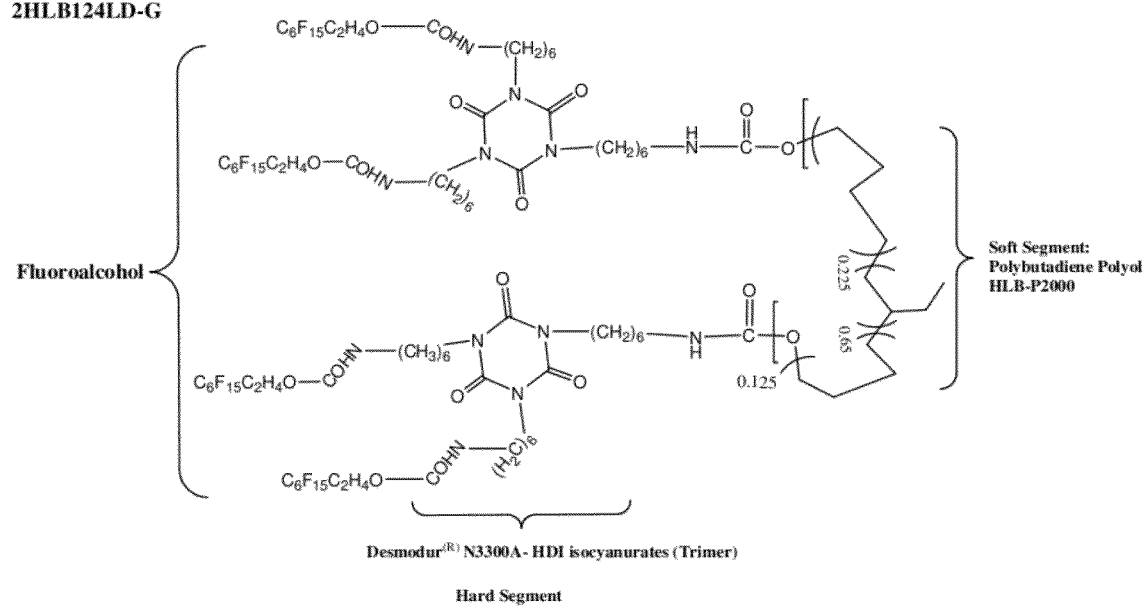
Figure 1F:
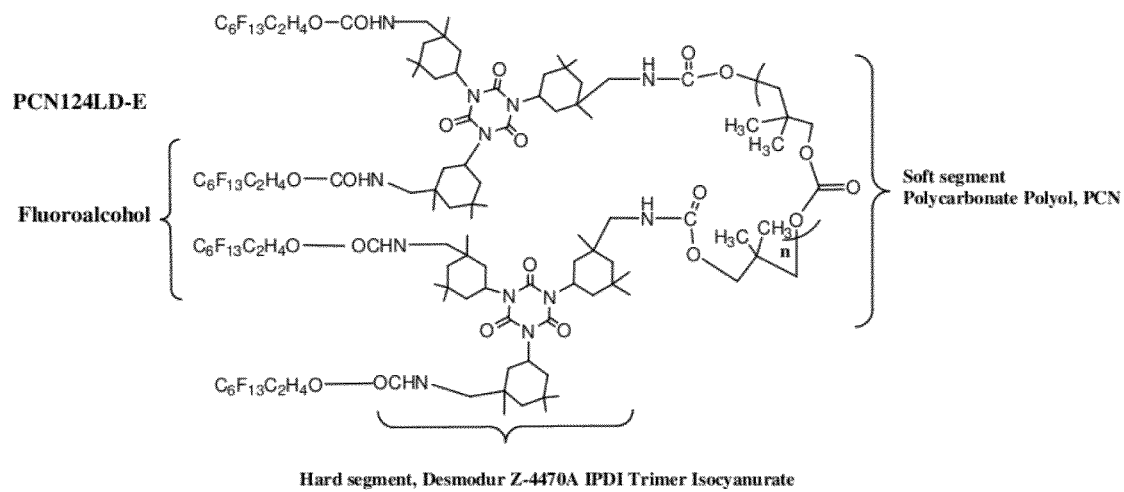
Figure 1G:
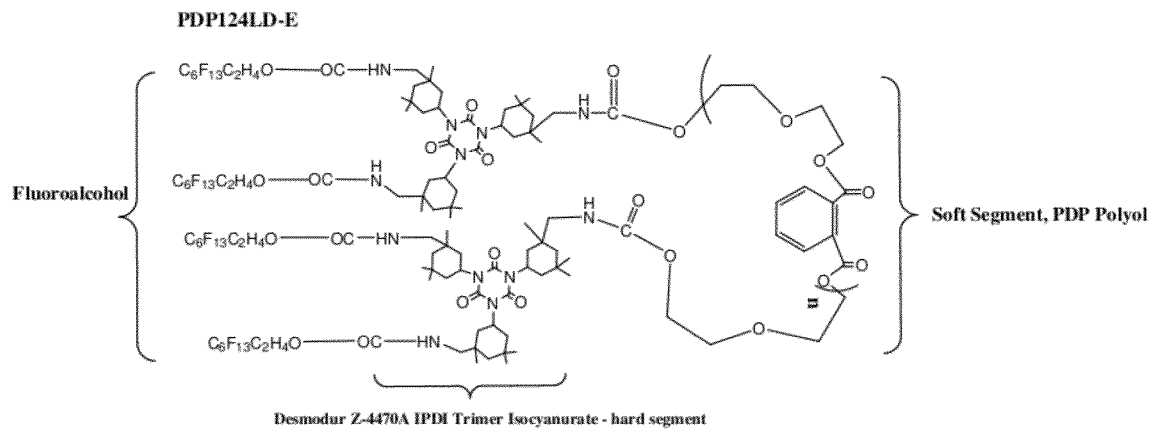
Figure 1H:
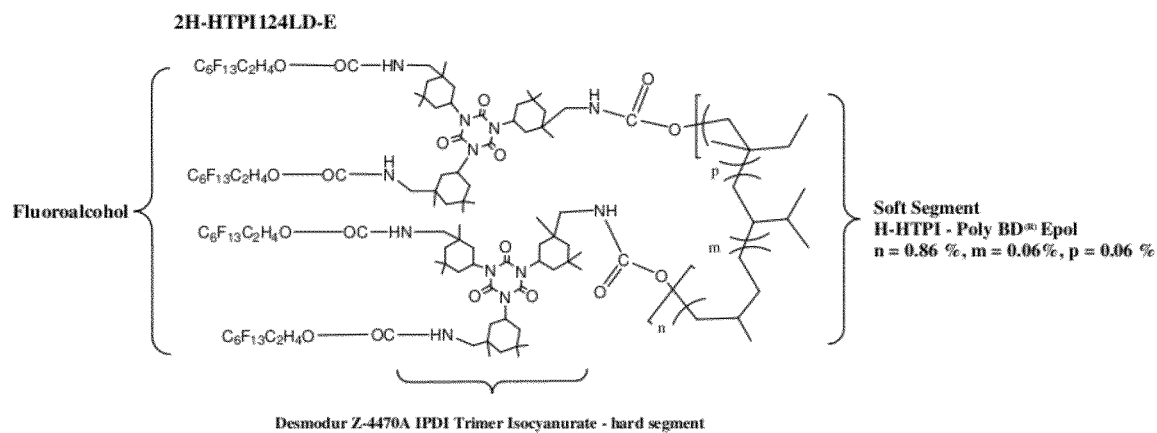
Figure 1I:
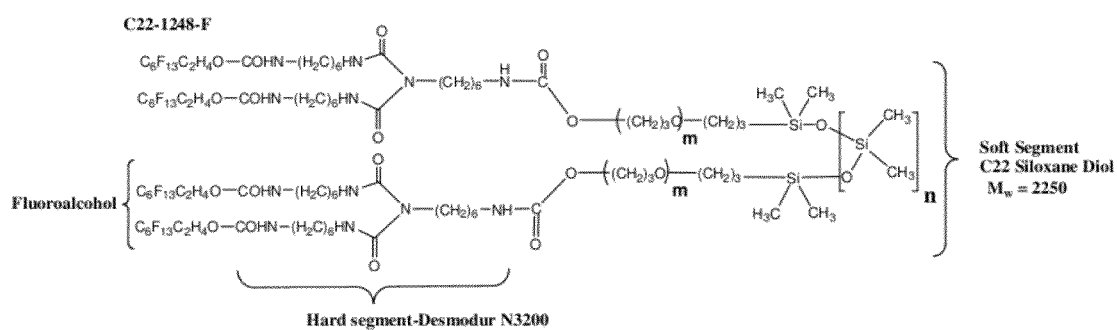
Figure 1J:
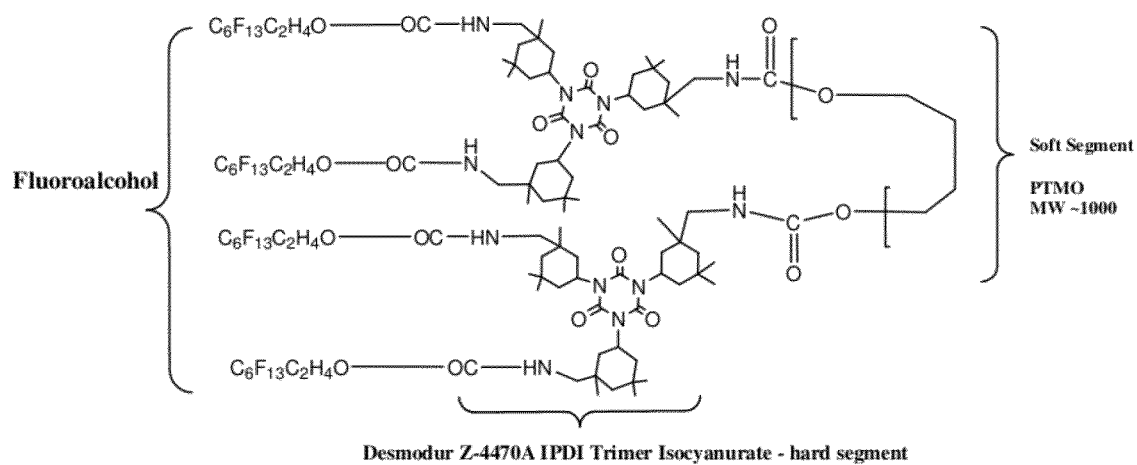
Figure 1K:
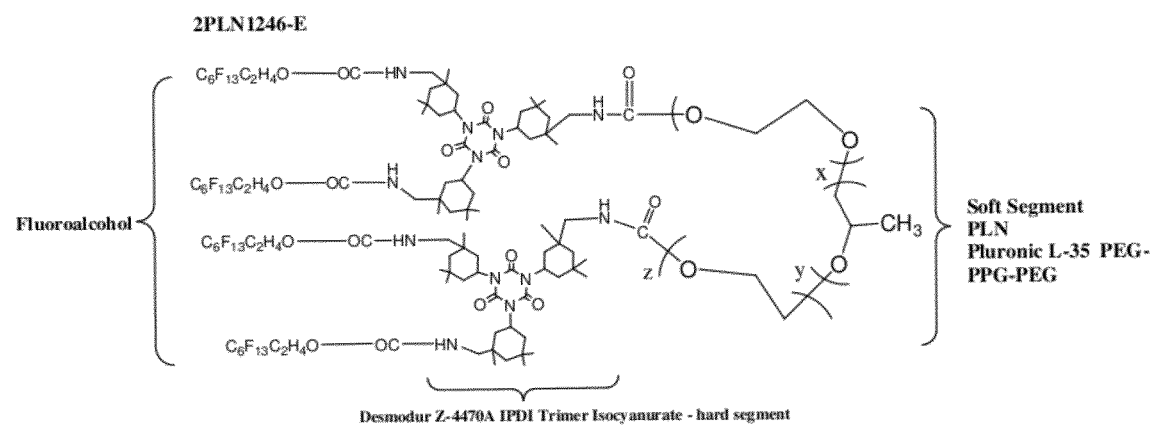

The methods and compositions of the invention feature thermally stable SMMs useful for the surface modification of a range of commercially available base polymers which are processed at high temperatures, such as polypropylene, polyethylene, polyesters, nylon, polyurethanes, silicones, PVC, polycarbonates, polysulfones, and polyethersulfones, among others.

The invention features a series of SMMs based on biurets and isocyanurates of hexamethylene diisocyanate and isophorone diisocyanate having enhanced fluorination. The SMMs also possess high temperature stability at temperatures >200° C. and compatibility with base polymers (e.g., polyurethanes, polyethylenes, polypropylenes, polysiloxanes, polyvinyl chlorides, and polycarbonate) and may be used in the manufacture of articles for both implantable and non-implantable devices.

To provide the required functional properties, the SMM additives in this invention are added into the desired base polymer during processing whether it is being extruded, meltspun, spunbond, solvent spun, or injection molded. The additives can impart material properties that include, but are not limited to: (a) heat and chemical resistance, mechanical strength, (b) oil and water repellency, (c) surface smoothness, (d) resistance to hydrocarbons, acids, polar solvents and bases, (e) dimensional stability at high temperatures, (f) hydrophobicity, (g) non-adhesive characteristics, (h) hydrophilicity characteristics, (i) biocompatibility, and (j) surface hardness.

Surface modifiers of the invention can be described by Formula (I):

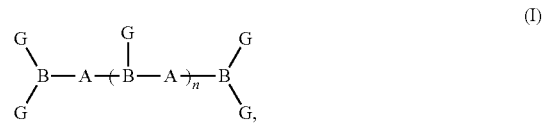

where in Formula (I)
(i) A is a soft segment comprising two hydroxyl end groups that are each covalently bound to B;
(ii) B is a hard segment comprising urethane trimer or biuret trimer; and
(iii) each G is a surface active group;
where n is an integer between 0 to 10.

Soft Segments

Exemplary soft segments include, but are not limited to: hydrogenated-hydroxyl terminated polybutadiene (HLBH), poly(2,2 dimethyl-1-3-propylcarbonate)diol (PCN), poly(hexamethylene carbonate)diol (PHCN), poly(ethylene-co-butylene)diol (PEB), hydroxyl terminated polybutadiene polyol (LBHP), poly(diethylene glycol)adipate (PEGA), poly(tetramethylene oxide)diol (PTMO), diethylene glycol-orthophthalic anhydride polyester polyol (PDP), 1,6-hexanediol-ortho phthalic anhydride polyester polyol (SPH), neopentyl glycol-orthophthalic anhydride polyester polyol (SPN), bisphenol A ethoxylate diol (BPAE), hydrogenated hydroxyl terminated polyisoprene (HHTPI), poly(2-butyl-2-ethyl-1,3-propylcarbonate)diol, hydroxylterminated polydimethylsiloxanes block copolymer (C22 or PrO-PDMS-PrO), polypropylene oxide (PPO), and polycaprolactone (PCL).

Suitable hard segments include biuret and urethane trimers (e.g., biurets and isocyanurates of hexamethylene diisocyanate and isophorone diisocyanate). Exemplary trimers suitable for use as hard segments are available as Desmodur products from Bayer. Exemplary Desmodur products useful in the macromolecules of the invention include:

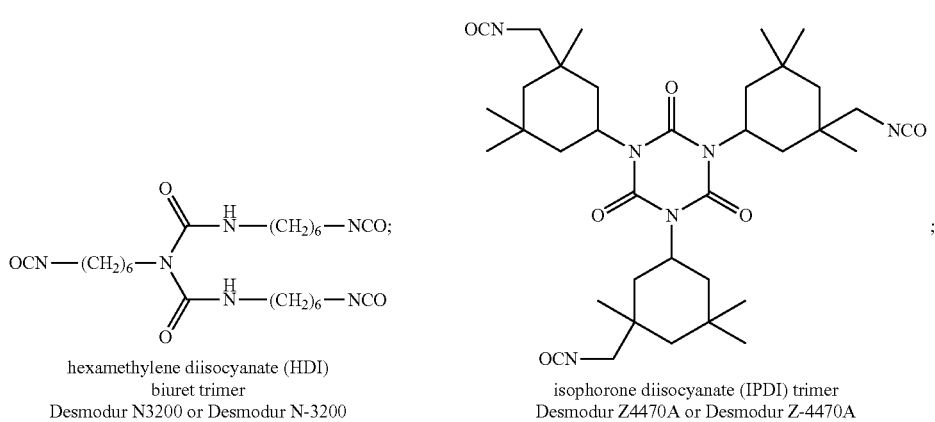

hexamethylene diisocyanate (HDI)
biuret trimer
Desmodur N3200 or Desmodur N-3200 isophorone diisocyanate (IPDI) trimer
Desmodur Z4470A or Desmodur Z-4470A

-continued
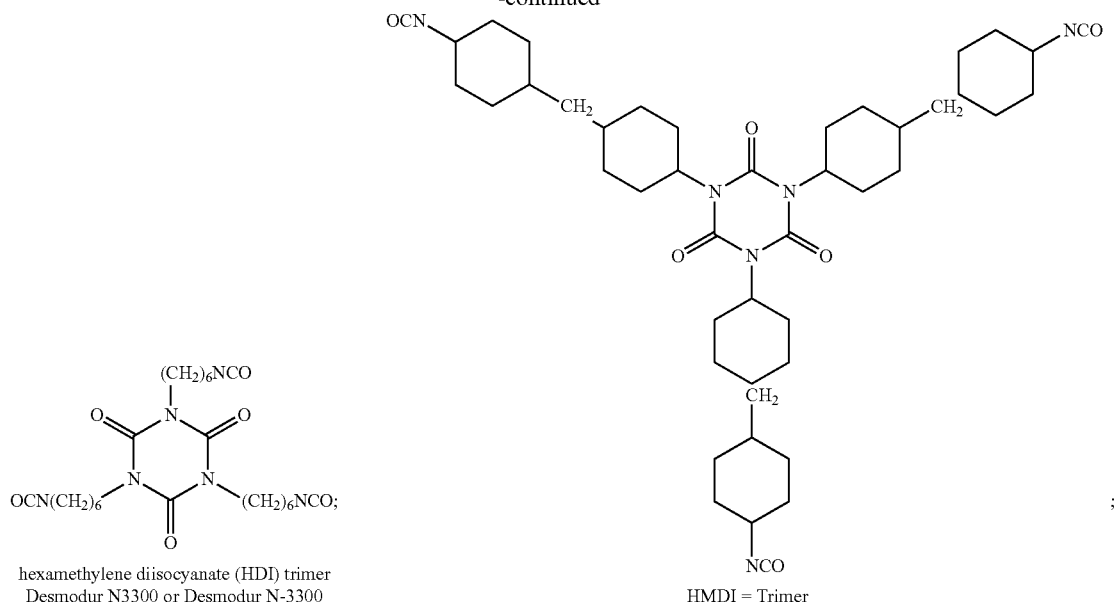
HMDI = Trimer
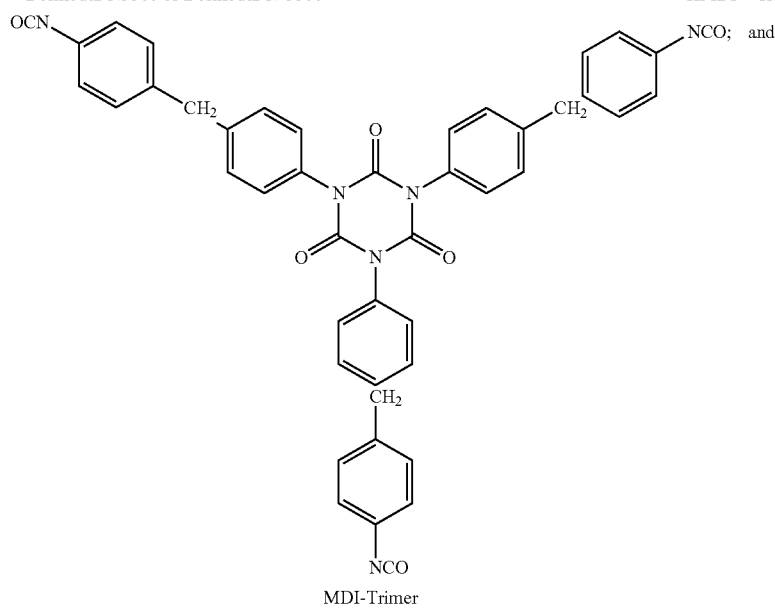
hexamethylene diisocyanate (HDI) trimer
Desmodur N3300 or Desmodur N-3300
MDI-Trimer
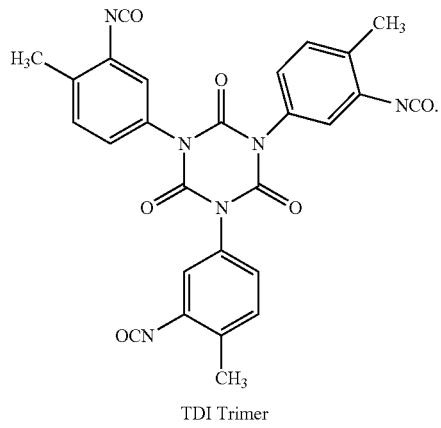
TDI Trimer Surface Active Groups Surface active groups include, without limitation, polydimethylsiloxanes, hydrocarbons, polyfluoroalkyl, fluorinated polyethers, and combinations thereof. Desirably, the surface active group is a polyfluoroalkyl, such as 1H,1H,2H, 2H-perfluoro-1-decanol; 1H,1H,2H,2H-perfluoro-1-octanol; 1H,1H,5H-perfluoro-1-pentanol; and 1H,1H, perfluoro-1-butanol, or mixtures thereof or a radical of the general formulas $CH_mF_{(3-m)}(CF_2)_rCH_2CH_2$— or $CH_mF_{(3-m)}(CF_2)_s(CH_2CH_2O)_\chi$—, where m is 0, 1, 2, or 3; $\chi$ is an integer between 1-10; r is an integer between 2-20; and s is an integer between 1-20.

Surface modifiers of the invention can be prepared as described in U.S. Pat. No. 6,127,507, incorporated herein by reference, and in Examples 1-6. Surface modifiers, according to the invention, can be selected in a manner that they contain a soft segment selected to impart thermal stability. Such soft segments can include hydrogenated-hydroxyl terminated polybutadiene, poly(2,2 dimethyl-1-3-propylcarbonate)diol, hydroxyl terminated polybutadiene polyol, poly(diethylene glycol)adipate, diethylene glycol-ortho phthalic anhydride polyester polyol, and 1,6-hexanediol-ortho phthalic anhydride polyester polyol. The invention also includes methods for increasing the thermal stability of an SMM using the synthetic methods described herein to improve their compatibility with the conditions characteristic of base polymer processing techniques. Desirably, the SMMs of the invention are prepared using catalysts that do not include tin, such as bismuth catalysts (e.g., bismuth carboxylate catalysts). It has been shown that residual tin in the final product is cytotoxic, and small amounts can also catalyze and accelerate the degradation of an SMM upon heating, leading to reduced thermal stability. The use of bismuth catalysts in the synthesis of urethanes is well known in the art (see, for example, U.S. Pat. Nos. 4,584,362; 4,742,090; 4,788,083; 5,064,871; and 6,353,057). Bismuth is non cytotoxic and environmentally friendly. The use of bismuth catalysts increases the biocompatibility of the polymers and leads to improved reaction kinetics, producing products that have narrower molecular weight distributions and are more thermally stable. As with tin, residual bismuth levels must be kept to a minimum to prevent depolymerization upon heating. Bismuth catalysts that can be purchased for use in the methods of the invention include Bi348, Bi221, and Bi601 (bismuth carboxylates, King Industries, Norwalk Conn.), as well as bismuth tris(neodecanoate) (NeoBi 200, Shepherd Chemicals). The soft segment of the surface modifier can function as an anchor for the surface modifier within the base polymer substrate upon admixture. The surface active groups are responsible, in part, for carrying the surface modifier to the surface of the admixture, where the surface active groups are exposed on the surface. As a result, once the surface modifier at the surface of any of the articles described herein is activated by contact with another surface, it is continuously replenished by the migration of surface modifier from the admixture to the surface. The latter process is believed to be driven by tendency towards establishing a low surface energy at the mixture's surface. When the balance between anchoring and surface migration is achieved, the surface modifier remains stable at the surface of the polymer while simultaneously altering surface properties.

Suitable base polymers (which can be either thermoplastic or thermoset) include, without limitation, commodity plastics such as poly(vinyl chloride), polyethylenes (high density, low density, very low density), polypropylene, and polystyrene; engineering plastics such as, for example, polyesters (e.g., poly (ethylene terephthalate) and poly(butylene terephthalate)), polyamides (aliphatic, amorphous, aromatic), polycarbonates (e.g., aromatic polycarbonates such as those derived from bisphenol A), polyoxymethylenes, polyacrylates and polymethacrylates (e.g., poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEEK), polysulfones, polyimides, and polyetherimides; thermosets such as, for example, alkyd resins, phenolic resins, amino resins (e.g., melamine and urea resins), epoxy resins, unsaturated polyesters (including so-called vinyl esters), polyurethanes, allylics (e.g., polymers derived from allyldiglycolcarbonate), fluoroelastomers, and polyacrylates; and blends thereof.

The base polymer is combined with a surface modifier of the invention to form an admixture. Thermoplastic polymers are more preferred in view of their melt processability. The thermoplastic polymers are melt processable at elevated temperatures (e.g., above 200° C., 240° C., 270° C., or even 300° C.). Desirable thermoplastic base polymers for use in the admixtures of the invention include, without limitation, polypropylenes, polyethylenes, polyesters, polyurethanes, nylons, polystyrene, poly(methyl methacrylates), polyvinylacetates, polycarbonates, poly(acrylonitrile-butadiene), styrene, polyvinylchloride, and blends thereof.

The surface modifier is added prior to melt processing of the base polymer to produce various articles. To form an admixture by melt processing, the surface modifier can be, for example, mixed with pelletized or powdered polymer and then melt processed by known methods such as, for example, molding, melt blowing, melt spinning, or melt extrusion. The surface modifier can be mixed directly with the polymer in the melt condition or can first be pre-mixed with the polymer in the form of a concentrate of the surface modifier/polymer admixture in a brabender mixer. If desired, an organic solution of the surface modifier can be mixed with powdered or pelletized polymer, followed by evaporation of the solvent and then by melt processing. Alternatively, the surface modifier can be injected into a molten polymer stream to form an admixture immediately prior to extrusion into fibers, or any other desired shape.

After melt processing, an annealing step can be carried out to enhance the development of repellent characteristics of the base polymer. In addition to, or in lieu of, such an annealing step, the melt processed combination can also be embossed between two heated rolls, one or both of which can be patterned. An annealing step typically is conducted below the melt temperature of the polymer (e.g., at about 150-220° C. for up to 5 minutes in the case of polyamide). Alternatively, the finished article can be subjected to a heated sterilization process (e.g., ethylene oxide sterilization (EtO sterilization) at 54.4° C.).

The surface modifier is added to thermoplastic or thermosetting polymer in amounts sufficient to achieve the desired repellency properties for a particular application. Typically, the amount of surface modifier used is in the range of 0.05-15% (w/w) of the admixture. The amounts can be determined empirically and can be adjusted as necessary or desired to achieve the repellency properties without compromising other physical properties of the polymer.

For example, where the base polymer-SMM admixture is processed to produce melt-blown or melt-spun fibers, these fibers can be used to make non-woven fabrics which have utility in any application where some level of repellency is desired. For example, the SMMs of the invention can be used for medical fabrics, medical and industrial apparel, fabrics for use in making clothing, home furnishings, and filtration systems, such as chemical process filters or respirators. Other applications are in the automotive and construction industries. The fabrics exhibit alcohol and water repellency characteristics. The fabrics can also exhibit oil repellency (and soil resistance) characteristics under a variety of environmental conditions and can be used in a variety of applications.

Non-woven webs or fabrics can be prepared by processes used in the manufacture of either melt-blown or spunbonded webs. For example, a process similar to that described by Wente in "Superfine Thermoplastic Fibers," *Indus. Eng'g Chem.* 48, 1342 (1956) or by Wente et al. in "Manufacture of Superfine Organic Fibers," *Naval Research Laboratories Report No.* 4364 (1954) can be used. Multi-layer constructions made from non-woven fabrics enjoy wide industrial and commercial utility, for example, as medical fabrics. The makeup of the constituent layers of such multi-layer constructions can be varied according to the desired end-use characteristics, and the constructions can comprise two or more layers of melt-blown and spunbonded webs in many useful combinations such as those described in U.S. Pat. No. 5,145,727 (Potts et al.) and U.S. Pat. No. 5,149,576 (Potts et al.), the descriptions of which are incorporated herein by reference. In multi-layer constructions, the surface modifier can be used in one or more layers to impart repellency characteristics to the overall construction.

Alternatively, the base polymer-SMM admixture is melt processed to produce a desired shape using an appropriate mold.

Articles

The surface modifiers and admixtures of the invention can be used in films and nonwoven applications, e.g., surgical drapes, gowns, face masks, wraps, bandages, and other protective wear garments for medical technicians (e.g. workers overalls, labcoats) require high temperature processing often exceeding 200° C. in the form of extruded articles (e.g., thermoplastic films, thermoplastic fibers, fibrous nonwoven materials, thermoplastic foam materials, etc.) where processing temperatures can reach a range of 250-300° C. The surface modifiers and admixtures of the invention can also be used in implantable medical devices (e.g., central venous catheters to impart reduced occlusion properties, and increased blood compatibility). The surface modifiers and admixtures of the invention may also be used in hollow fiber membrane filtration made from polyethylene, polypropylenes, or polysiloxane base polymers for fluid or gas separation.

The surface modifiers and admixtures of the invention have the required high temperature stability during the processing in nonwoven fabric manufacturing or the compatibility with the polymers that are used in catheter manufacture. The admixtures therefore can provide the required resistance to degradation at high temperatures while providing the water and/or oil and/or alcohol repellency together with the desired biocompatible properties. The technology involves the incorporation of the SMMs into the base polymers which then bloom to the surface, thus modifying the surface of the polymers but keeping the bulk properties intact. The base polymers now have a fluorinated surface with a high degree of hydrophobicity.

Implanted Devices

Articles that may be formed from the admixtures of the invention include implanted devices. Implanted devices include, without limitation, prostheses such as pacemakers, electrical leads such as pacing leads, defibrillators, artificial hearts, ventricular assist devices, anatomical reconstruction prostheses such as breast implants, artificial heart valves, heart valve stents, pericardial patches, surgical patches, coronary stents, vascular grafts, vascular and structural stents, vascular or cardiovascular shunts, biological conduits, pledges, sutures, annuloplasty rings, stents, staples, valved grafts, dermal grafts for wound healing, orthopedic spinal implants, orthopedic pins, intrauterine devices, urinary stents, maxial facial reconstruction plating, dental implants, intraocular lenses, clips, sternal wires, bone, skin, ligaments, tendons, and combination thereof. Percutaneous devices include, without limitation, catheters of various types, cannulas, drainage tubes such as chest tubes, surgical instruments such as forceps, retractors, needles, and gloves, and catheter cuffs. Cutaneous devices include, without limitation, burn dressings, wound dressings and dental hardware, such as bridge supports and bracing components.

In a particular embodiment, admixtures that include a surface modifier that includes a polysiloxane as a soft segment are used in the manufacture of catheters.

The following examples are put forth so as to provide those of ordinary skill in the art with a complete disclosure and description of how the methods and compounds claimed herein are performed, made, and evaluated, and are intended to be purely exemplary of the invention and are not intended to limit the scope of what the inventors regard as their invention.

The SMMs of the invention can be constructed by appropriate design combinations of the hard segments (e.g., diisocyanates or triisocyanates), central soft segments (e.g., diols), and the fluorinated end-capping groups to form a wide range of polyurethanes with the desired high degradation temperatures, and specifically employing bismuth catalysts in the polymerization. These include, but are not limited to, the component reagents mentioned below.

Diisocyanates
HMDI=4,4'-methylene bis(cyclohexyl isocyanate)
IPDI=Isophorone Diisocyanate
TMXDI=m-tetramethylenexylene Diisocyanate
HDI=Hexamethylene Diisocyanate
Triisocyanates (Hard Segments)
Desmodur N3200 or Desmodur N-3200=hexamethylene diisocyanate (HDI) biuret trimer
Desmodur Z4470A or Desmodur Z-4470A=isophorone diisocyanate (IPDI) trimer
Desmodur N3300=hexamethylene diisocyanate (HDI) trimer:
Diols/Polyols (Soft Segments)
HLBH=Hydrogenated-hydroxyl terminated polybutadiene,
PCN=Poly (2,2 dimethyl-1-3-propylcarbonate)diol
PHCN=Poly(hexamethylene carbonate)diol
PEGA=Poly(diethylene glycol)adipate
PTMO=Poly(tetramethylene Oxide)diol
PDP=Diethylene Glycol-Ortho phthalic Anhydride polyester Polyol
HHTPI=hydrogenated hydroxyl terminated polyisoprene
C22=hydroxylterminated polydimethylsiloxanes block copolymer
Poly(ethylene glycol)-block-poly(propylene glycol))-block-Poly(ethylene glycol) polymer ("PEO-PPO-PEO Pluronic polymers")
DDD=1,12-dodecanediol
Fluorinated End-Capping Groups
C6-FOH=$(CF_3)(CF_2)_5CH_2CH_2OH$ (1H,1H,2H,2H Perfluorooctanol)
C8-FOH=$(CF_3)(CF_2)_7CH_2CH_2OH$ (1H,1H,2H,2H Perfluorodecanol)

C6-C8 FOH=$(CF_3)(CF_2)_7CH_2CH_2OH$ and $(CF_3)(CF_2)_5CH_2CH_2OH$ (Mixtures of
C6-FOH and C8-FOH; also designated as BAL-D)
C4-FOH=$CHF_2(CF_2)_3CH_2OH$ (1H,1H,5H-perfluoro-1-pentanol)
C3-FOH=$(CF_3)(CF_2)_2CH_2OH$ (1H,1H Perfluorobutanol)
Non-Tin Based Catalyst
Bi348—Bismuth Carboxylate Type 1
Bi221—Bismuth Carboxylate Type 2
Bi601—Bismuth Carboxylate Type 3

The bismuth catalysts listed above can be purchased from King Industries (Norwalk Conn.). Any bismuth catalyst known in the art can be used to synthesize the SMMs of the invention.

EXAMPLE 1

General Synthetic Schemes for SMM4 and SMM6

Surface modifiers of the invention such as SMM4 and SMM6 may be synthesized by a 2-step convergent method according to the schemes depicted in Schemes 1 and 2.

Briefly, the polyisocyanate such as Desmodur N3200 or Desmodur 4470 is reacted dropwise with the surface active group (e.g., a fluoroalkyl alcohol) in an organic solvent (e.g. anhydrous THF or dimethylacetamide (DMAC)) in the presence of a catalyst at 25° C. for 2 hours. After addition of the fluorinated alcohol, stirring is continued for 1 hour at 50° C. and for a further 1 hour at 70° C. These steps lead to the formation of a partially fluorinated intermediate that is then coupled with the polyol (e.g., hydrogenated-hydroxyl terminated polybutadiene, or poly(2,2 dimethyl-1-3-propyl carbonate) diol) at 70° C. over a period of 14 hours to provide the SMM. Because the reactions are moisture sensitive, they are carried out under an inert $N_2$ atmosphere and anhydrous conditions. The temperature profile is also maintained carefully, especially during the partial fluorination, to avoid unwanted side reactions. The reaction product is precipitated in MeOH and washed several times with additional MeOH. The catalyst residues are eliminated by first dissolving the SMM in hot THF or in hot IPA followed by reacting the SMM with EDTA solution, followed by precipitation in MeOH. Finally, the SMM is dried in a rotary evaporator at 120-140° C. prior to use.

Scheme 1

Example 1: Synthetic Scheme for SMM's with Desmodur Biurets

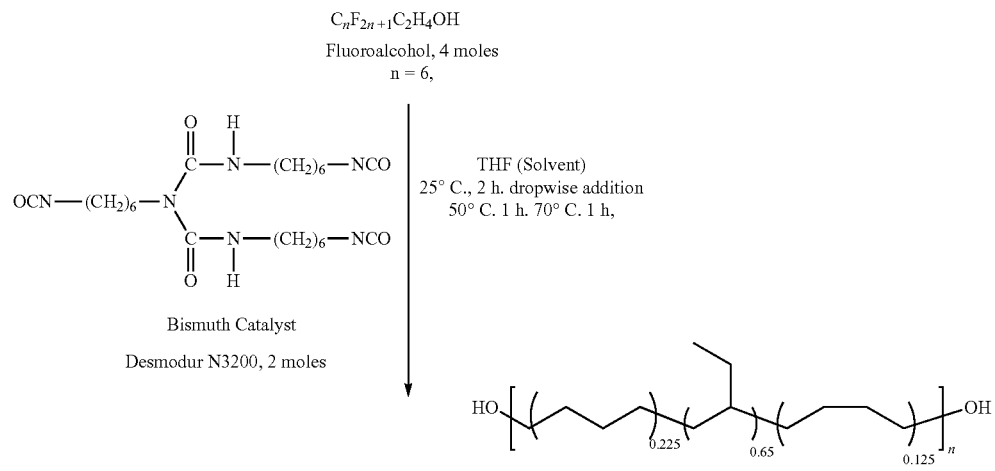

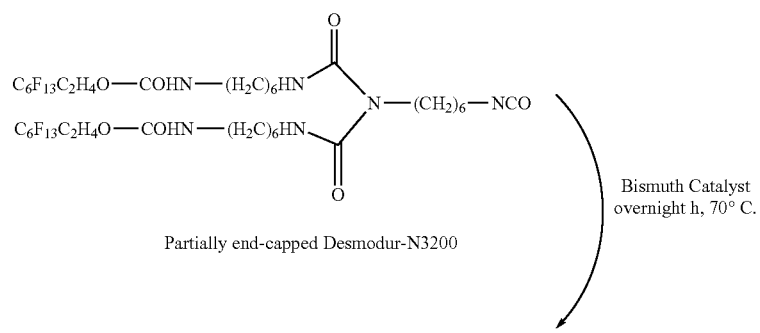

Partially end-capped Desmodur-N3200

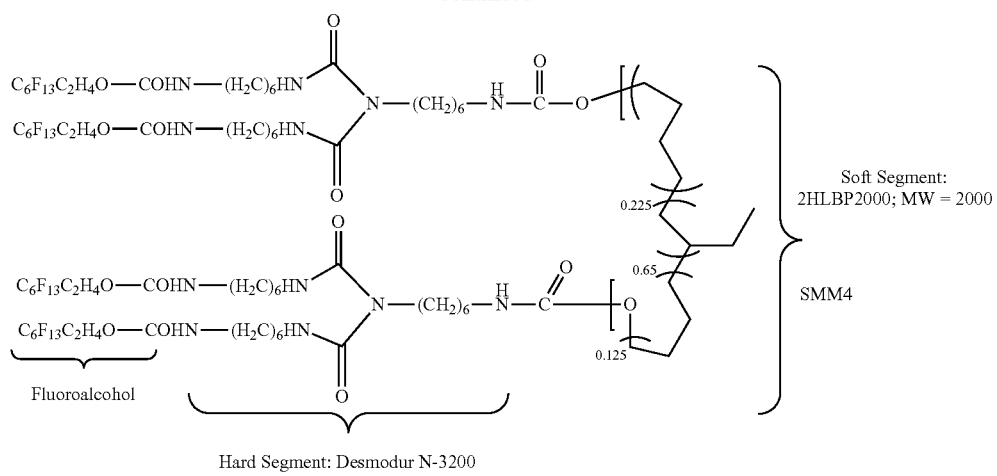
Scheme 2
Example 2: Synthetic Scheme for SMM's - with Desmodur Isocyanurates
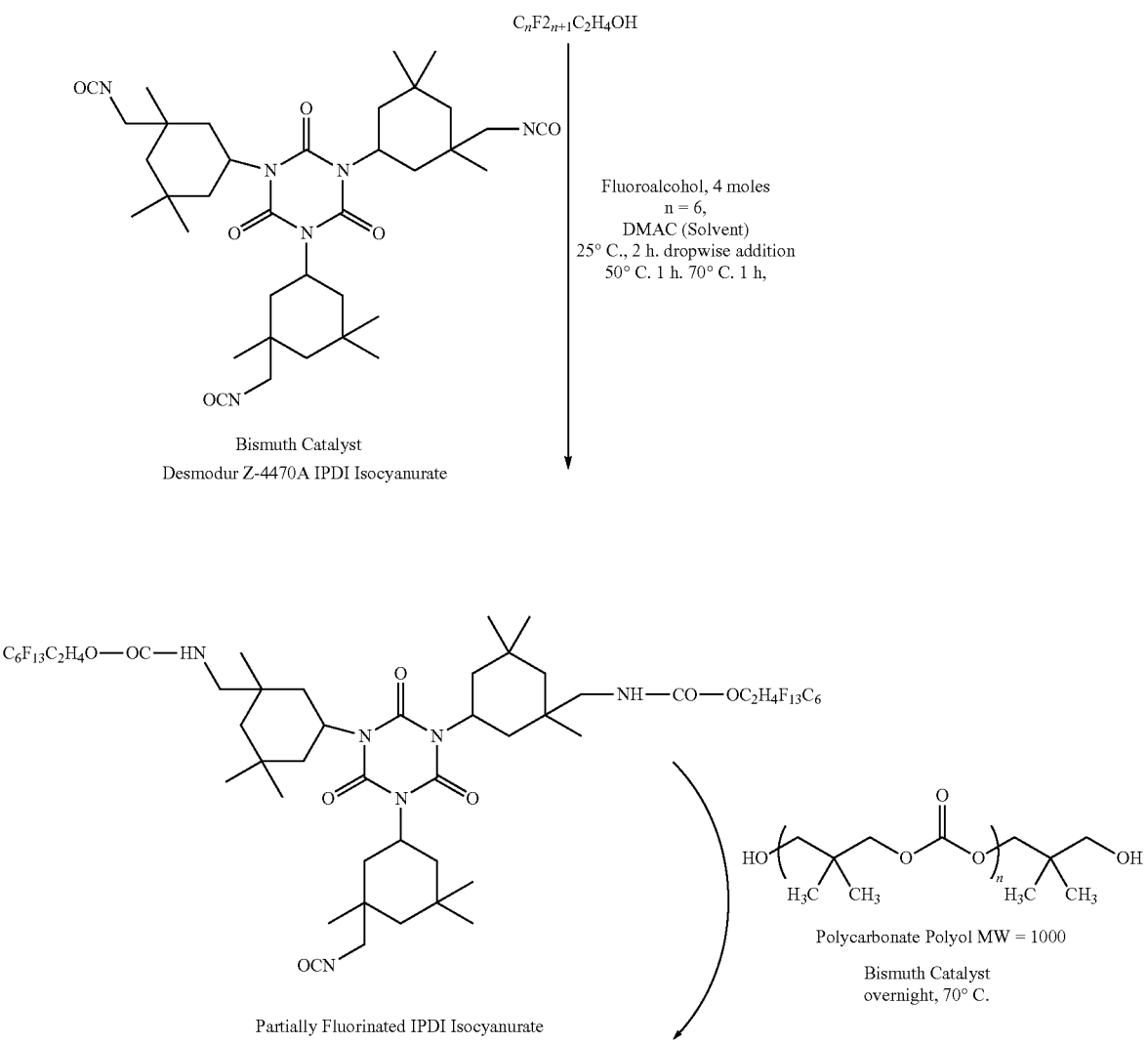

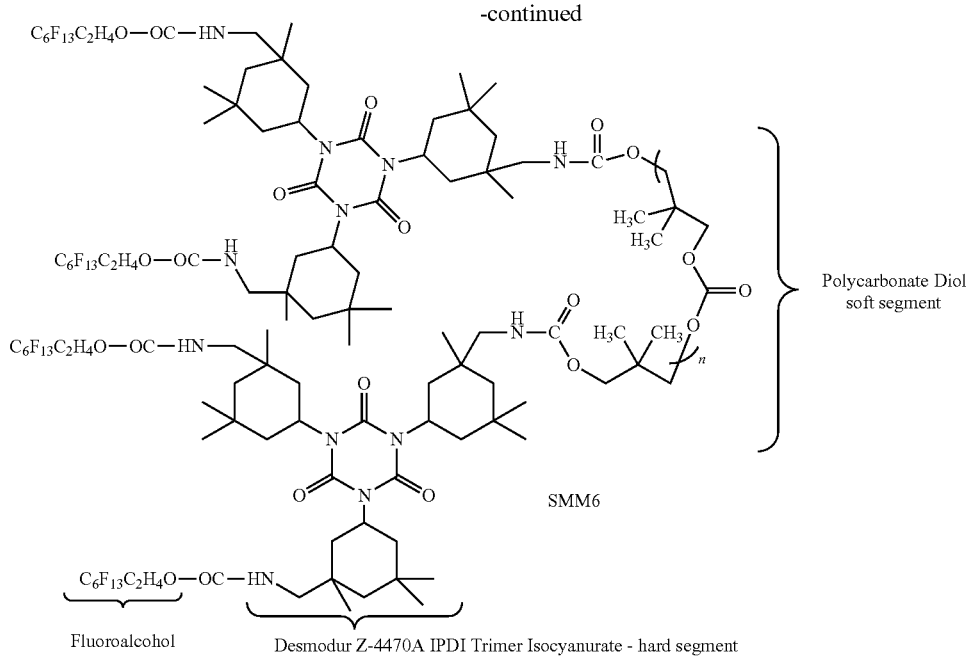

SMM6

Fluoroalcohol — Desmodur Z-4470A IPDI Trimer Isocyanurate - hard segment — Polycarbonate Diol soft segment

EXAMPLE 2

Synthesis of SMM5

All glassware were dried in the oven overnight at 110° C. To a 3-necked 5000 mL reactor equipped with a stir bar and a reflux condenser was added 300 g (583 mmol) of Desmodur N3300. The mixture was degassed overnight at ambient temperature. Hydrogenated-hydroxyl terminated polybutadiene (HLBH polyol MW=2000) was measured into a 2000 mL flask and degassed at 60° C. overnight. The bismuth catalyst K-Kat 348 (a bismuth carboxylate; available from King Industries) was measured out into a 250 mL flask and degassed overnight at ambient temperature. The perfluorinated alcohol was measured into a 1000 mL flask and degassed for 30 minutes at ambient temperature. After degassing, all the vessels were purged with nitrogen.

300 mL of THF (or DMAC) was then added to the Desmodur N3300 containing vessel, and the mixture was stirred to dissolve the polyisocyanate. Similarly, 622 mL of THF was added to the HLBH polyol, and the mixture was stirred to dissolve the polyol. Likewise, 428 mL of THF (or DMAC) was added to the perfluorinated alcohol and the mixture was stirred to dissolve. Similarly for K-Kat 348 which was dissolved in 77 mL of THF or DMAC. Stirring was continued to ensure all the reagents were dissolved in their respective vessels.

Half the K-Kat solution was transferred to the perfluorinated solution which was stirred for 5 minutes. This solution was added to the reaction vessel containing the Desmodur N3300 solution dropwise over a period of 2 hours at ambient (25° C.) temperature through a cannula (double ended needle) under positive nitrogen pressure. After addition, the temperature was raised to 50° C. for 1 hour and 70° C. for another 1 hour. Proper stirring was maintained throughout. The remaining K-Kat 348 catalyst was transferred to the HLBH-2000 flask; after stirring to dissolve, this was added to the reactor containing the N3300. The reaction mixture was allowed to react overnight for 14 hours at 70° C. to produce SMMS with 4 fluorinated end groups.

SMM/Polymer Admixture

The SMM solution was allowed to cool at ambient temperature. A 30 L flask was filled with 15 liters of MeOH (methanol) and the polymer solution was slowly pored into this vessel with constant stirring for 10 minutes, at which time the polymer began to precipitate out. The crude polymer was allowed to settle, and the supernatant was siphoned out. The polymer was washed 2× with MeOH (5 L), each time with vigorous stirring. The polymer was redissolved in THF at 70° C., and an EDTA solution (240 mL) was added. This was stirred at 70° C., after which another 240 mL of EDTA solution was added. The heat was turned off, and the solution was stirred for another 30 minutes. To this mixture 15 L of MeOH was slowly added to precipitate the polymer. The supernatant was carefully siphoned out and the washing was completed with the addition of two portions of MeOH, using 5 L each time. The polymer was transferred to a rotary evaporator and dried at 120-140° C. The purified polymer was stored in glass jars in a dessicator.

Figure 1M:
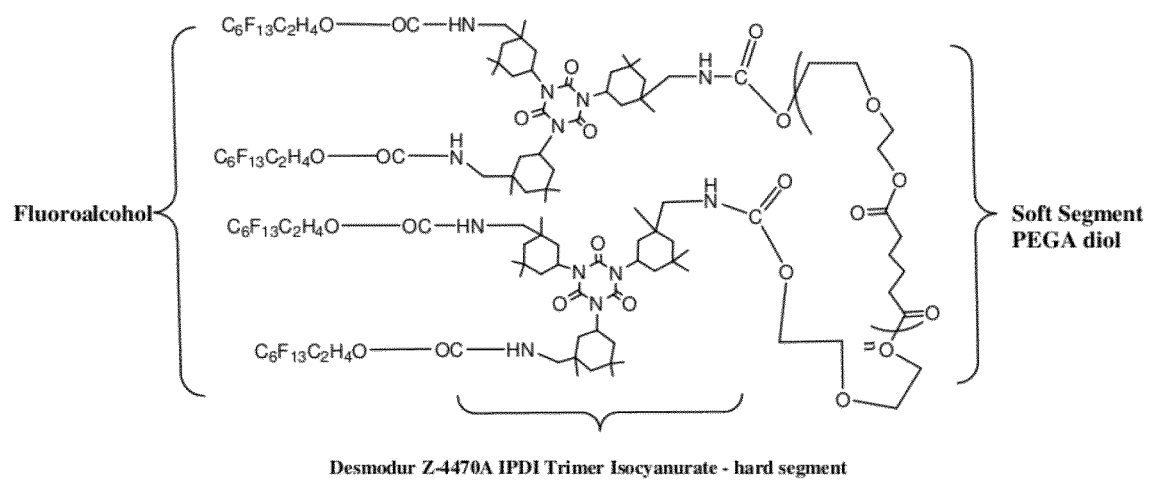
Figure 1N:
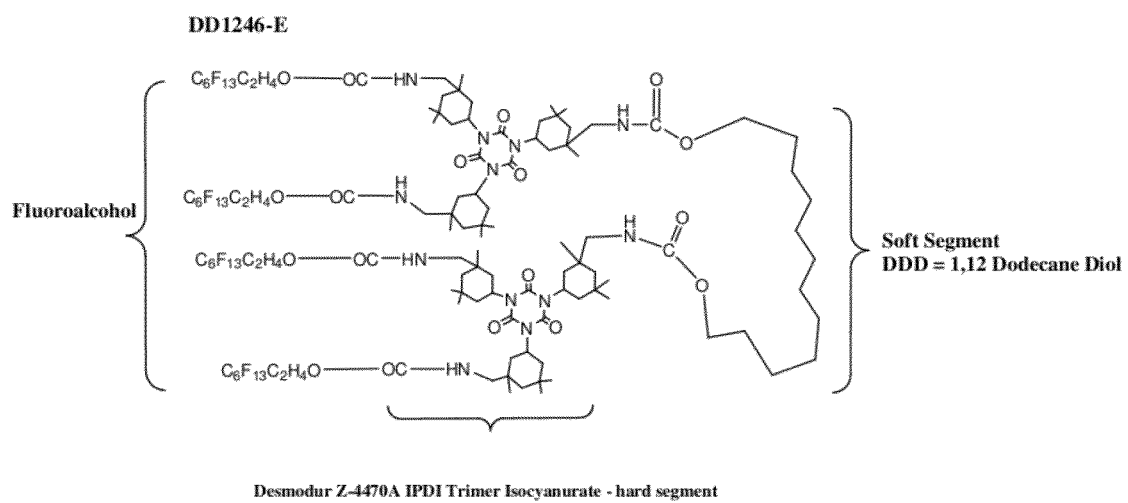

Examples of exemplary SMMs that can be prepared according to the procedures described herein are illustrated in FIGS. 1a-1n.

EXAMPLE 3

Thermal Stability

The thermal degradation temperatures of the surface modifiers (SMM) were determined by a Thermogravimetric Analysis instrument (TGA). Thermogravimetric analysis (TGA) is often used to determine thermal stability by means of weight-loss decomposition profiles as a function of temperature. This was carried out using a TA instruments TGA Q500 (V6.3 Build 189 with autosampler) Thermogravimetric Analyzer operating in Dynamic (High Resolution), Hi-Res™ mode <resolution: 4, max ramp: 50° C./min, max temp: 500° C.

Briefly, 20-50 mg of each sample was placed into 1004, platinum plans suspended from an analytical balance located outside the furnace chamber. After the balance was zeroed, the sample pan was heated from ambient to 500° C. in a Nitrogen atmosphere, $N_2$ (flow rate 40 cc/min balance, 60 cc/min. furnace). The Hi-Res TGA mode varies the heating rate as a function of sample weight loss rate, which allows the use of high heating rates during no weight loss regions and reduced heating rates at weight loss transitions to more accurately depict the decomposition characteristics of the test sample. This technique improves the reproducibility and resolution of onsets by separating overlapping or poorly defined events, and it eliminates the dependence of decomposition behavior on the heating rate. A TGA plot indicating the weight loss and the rate of weight loss (or derivative) was plotted against the temperature using the Universal Analysis 2000 software (TA Instruments—Waters LLC, version 4.1D). If the material is completely dry, upon heating there is an onset (one or two depending upon the nature of the polymer) representing the start of degradation.

Figure 2:
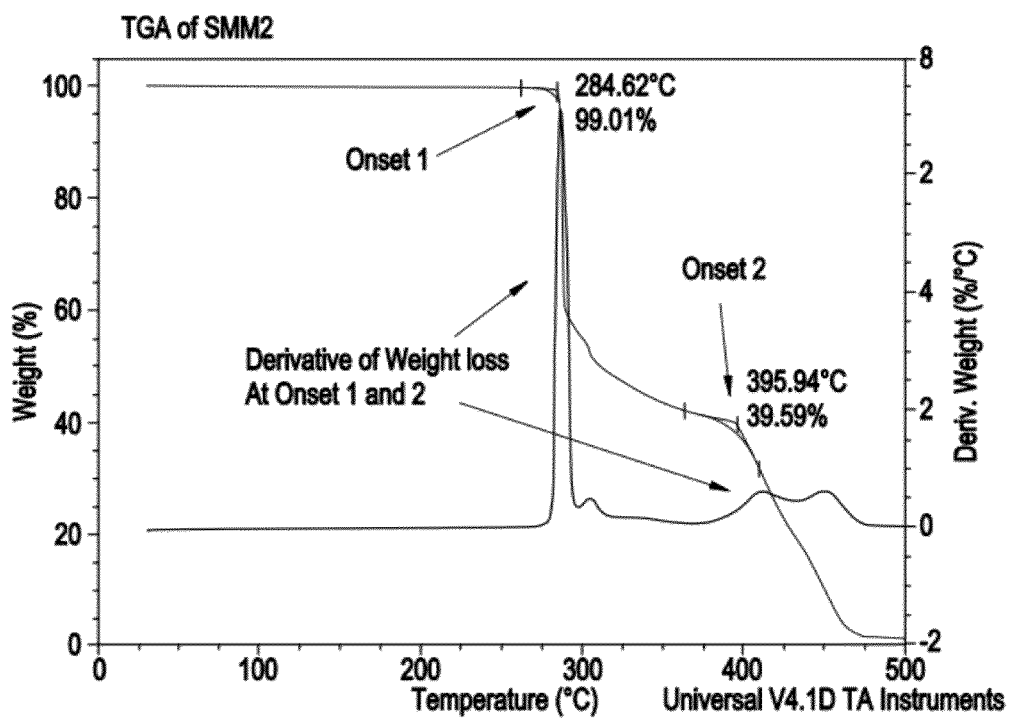
FIG. 2 is a graph depicting the High Resolution Thermogravimetric profile of SMM2 indicating a first onset at a degradation temperature $T_{d1}=284°$ C., representing a minor weight loss (−1%) followed by a major weight loss at T=396° C. (−61%).
Figure 3:
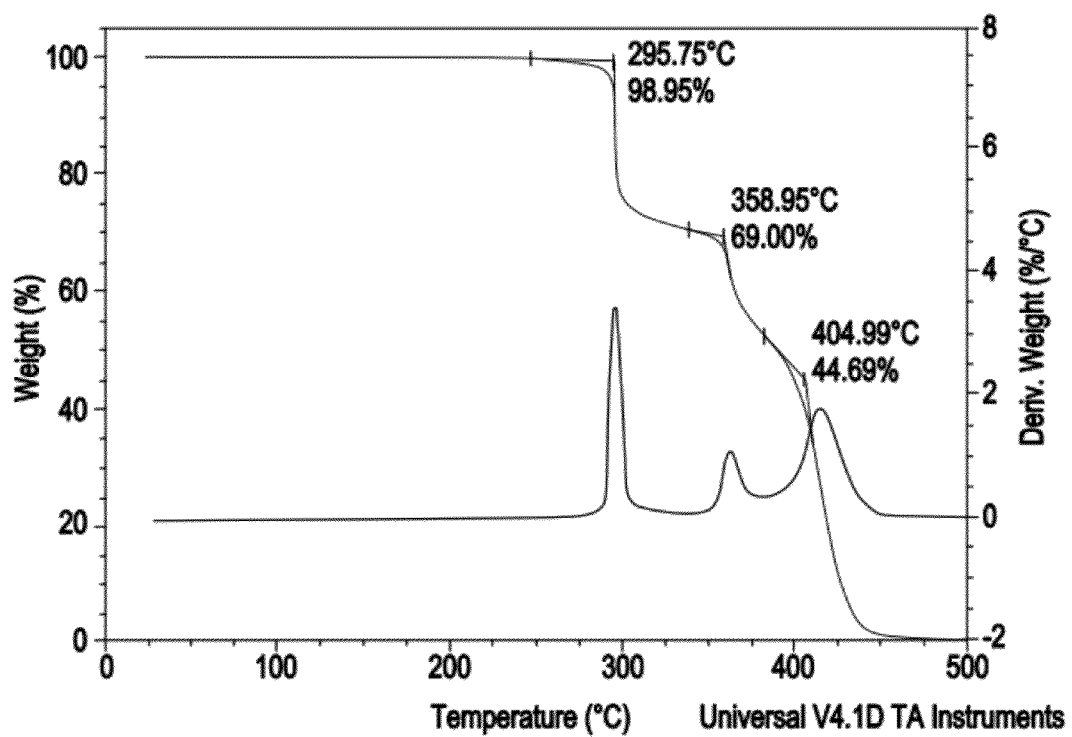
FIG. 3 is a graph depicting the High Resolution Thermogravimetric profile of SMM3 indicating a first onset at a degradation temperature $T_{d1}=295°$ C., representing a minor weight loss (−1.1%) followed by a major weight loss at $T_{d2}=405°$ C. (−55.31%).
Figure 4:
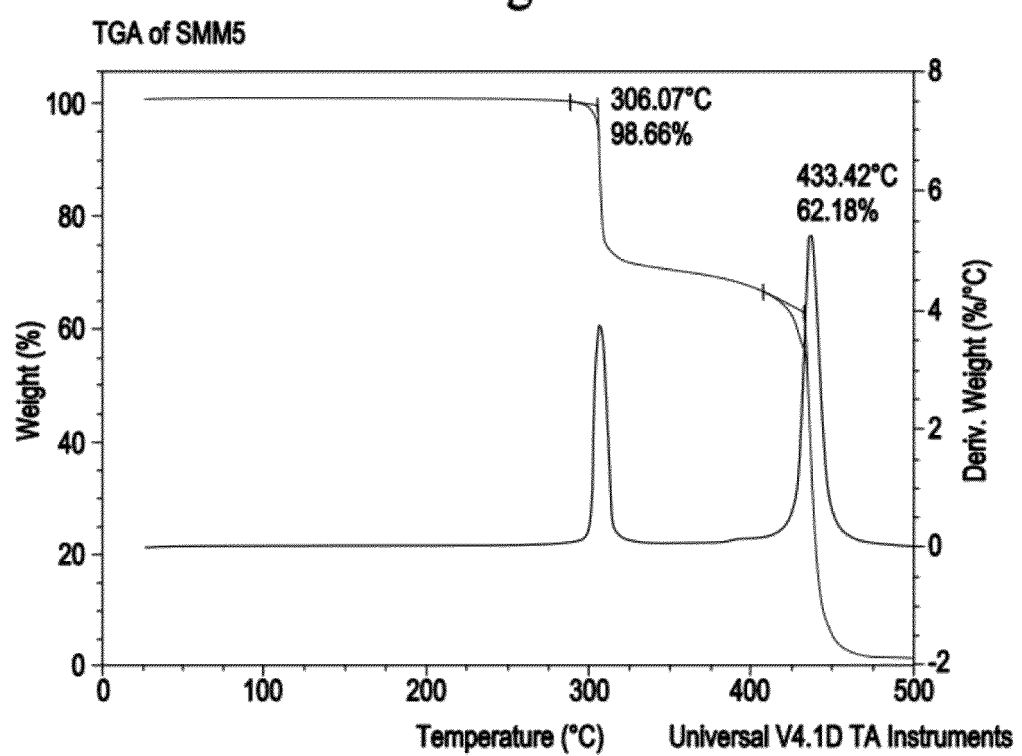
FIG. 4 is a graph depicting the High Resolution Thermogravimetric profile of SMM5 indicating a first onset at a degradation temperature $T_{d1}=306°$ C., representing a minor weight loss (−1.34%) followed by a major weight loss at T=433° C. (−37.82%).
Figure 5:
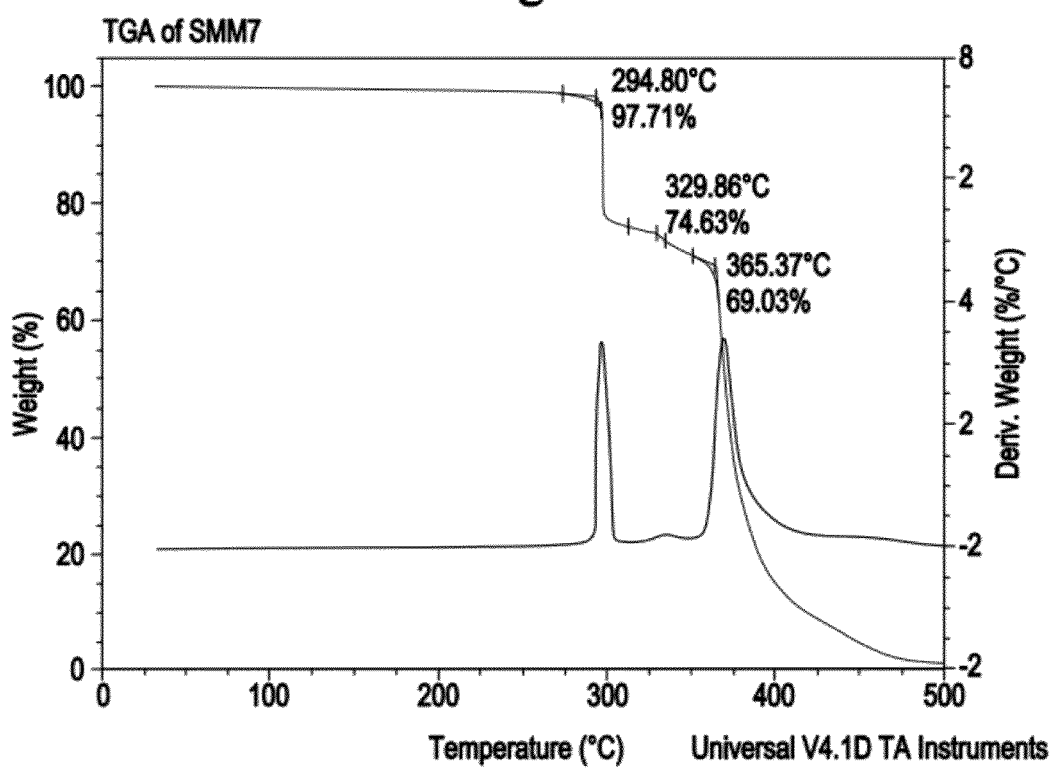
FIG. 5 is a graph depicting the High Resolution Thermogravimetric profile of SMM7 indicating a first onset at a degradation temperature $T_{d1}=295°$ C., representing a minor weight loss (−2.29%) followed by a major weight loss at $T_{d2}=365°$ C. (−31%).
Figure 6:
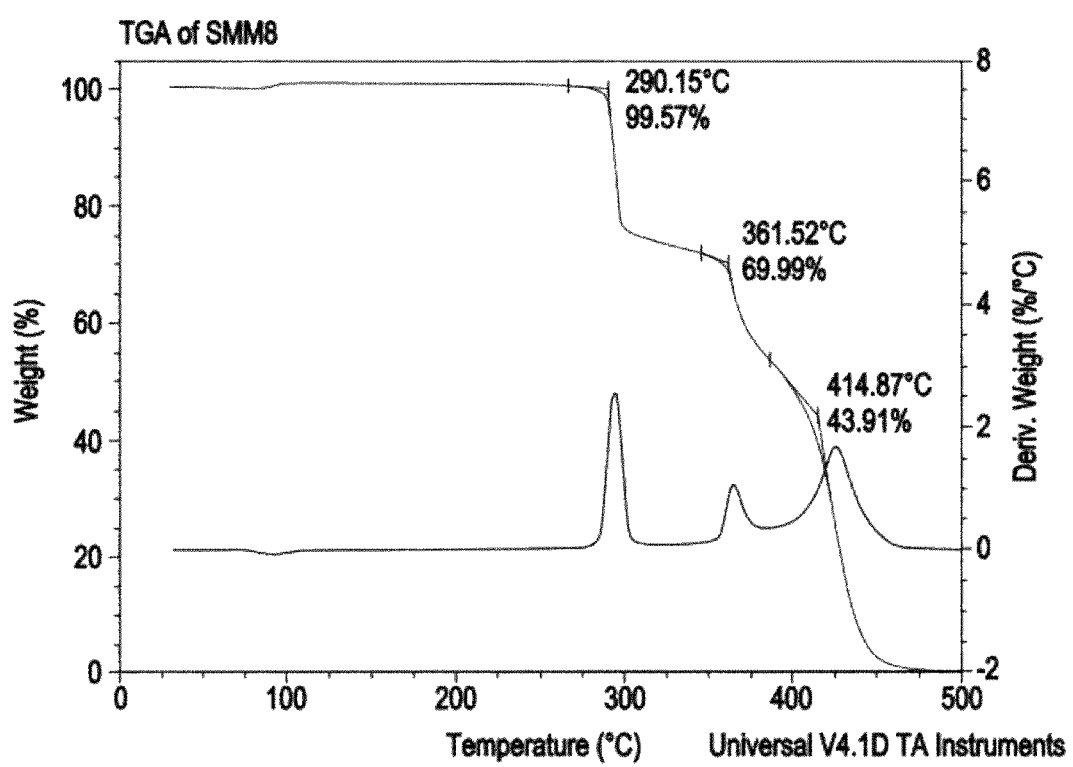
FIG. 6 is a graph depicting the High Resolution Thermogravimetric profile of SMM8 indicating a first onset at a degradation temperature $T_{d1}=290°$ C., representing a minor weight loss (−0.43%) followed by a major weight loss at $T_{d2}=415°$ C. (−56.09%).
Figure 7:
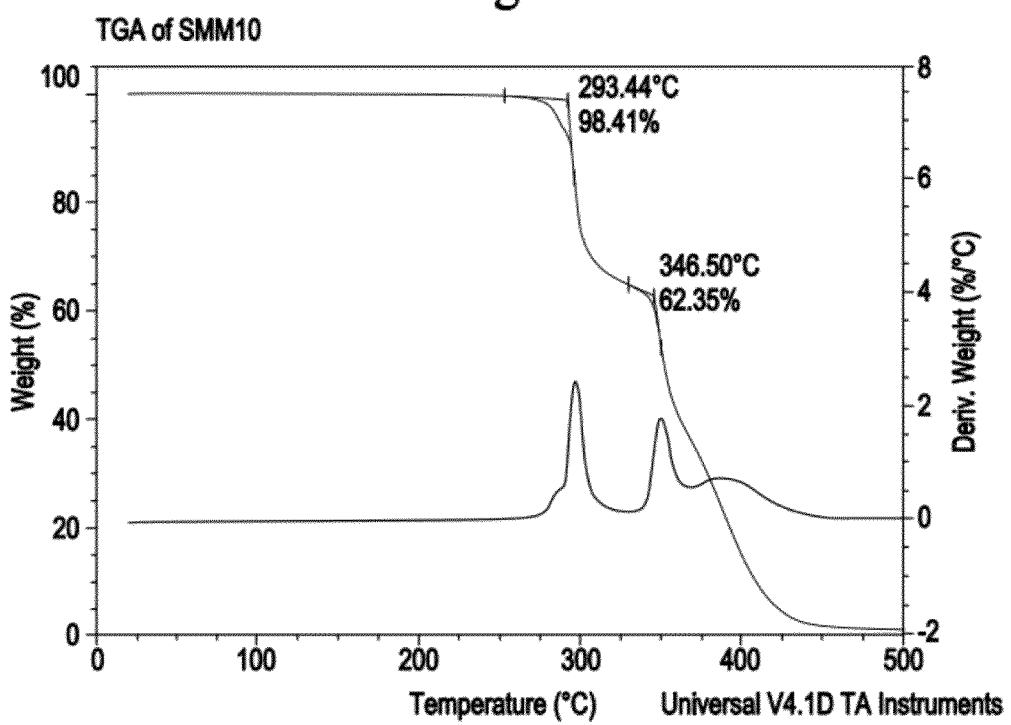
FIG. 7 is a graph depicting the High Resolution Thermogravimetric profile of SMM10 indicating a first onset at a degradation temperature $T_{d1}=293°$ C., representing a minor weight loss (−1.30%) followed by a major weight loss at $T_{d2}=347°$ C. (−37.70%).
Figure 8:
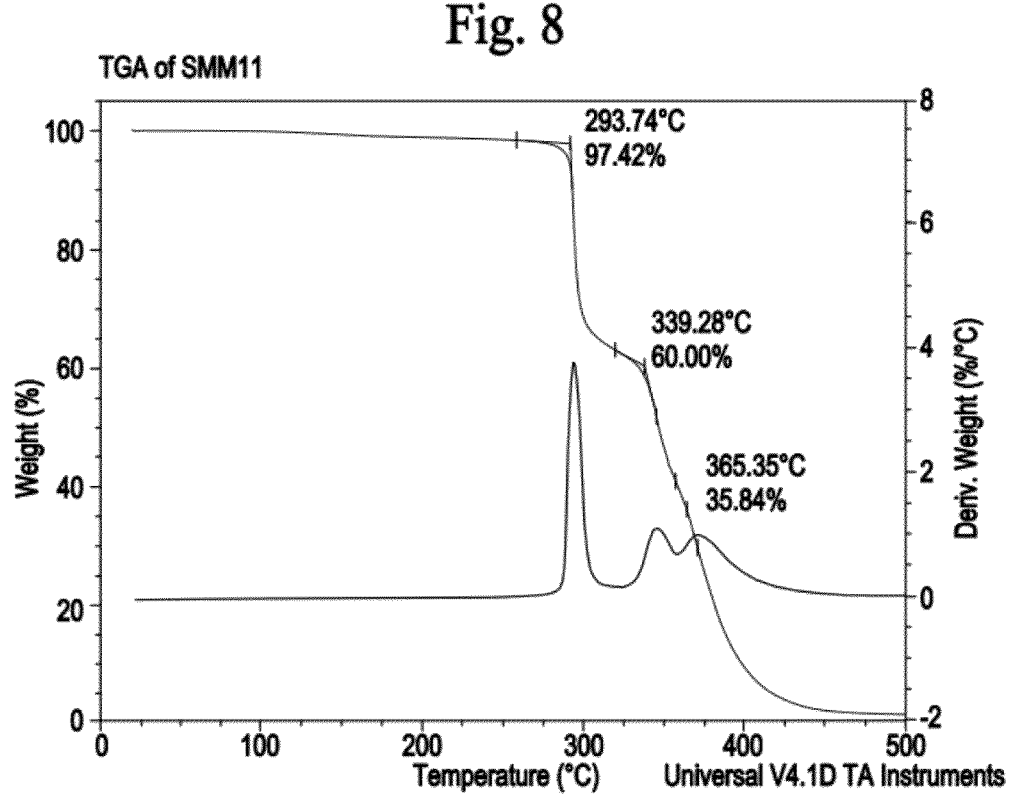
FIG. 8 is a graph depicting the High Resolution Thermogravimetric profile of SMM11 indicating a first onset at a degradation temperature $T_{d1}=294°$ C., representing a minor weight loss (−2.80%) followed by a major weight loss at $T_{d2}=339°$ C. (−40.16%).

As an illustrative example, FIG. 2 shows the profile of SMM2 indicating a first onset at a degradation temperature of $T_{d1}=285°$ C., representing a minor weight loss (−1%) due to fluoro-end groups and the hard segment (isocyanate linkage), followed by a major weight loss (−61%) at $T_{d2}=397°$ C. due to the soft segment (polyol linkage) of the SMM.

FIGS. 2-8 show the thermal degradation pattern of various examples of SMM having different chemistries. SMM2 (FIG. 2), SMM3 (FIG. 3), SMM 5 (FIG. 4), SMM 7 (FIG. 5), SMM8 (FIG. 6), SMM10 (FIG. 7), and SMM 11 (FIG. 8) are depicted by a High Resolution Thermogravimeteric Plot. Other thermal data and polymer characterization data, including TGA and EA results, are summarized in FIGS. 9A-9C.

EXAMPLE 4

Bulk Fluorine Analysis by Elemental Analysis (EA)

Bulk elemental (carbon, hydrogen, nitrogen, and fluorine) composition was analyzed by Galbraith Labs (Knoxville, Tenn.) according to ASTM D 5987 using a combustion elemental analyzer for carbon, hydrogen and nitrogen. Fluorine content was analyzed using an oxygen combustion bomb and a fluoride ion-selective electrode to measure the fluoride ions produced by the absorption of fluorine vapor into a dilute base solution inside the oxygen flask. Elemental fluorine from FIG. 9 indicates that all the SMMs have good bulk fluorine >15%.

EXAMPLE 5

Surface Elemental Analysis by X-Ray Photoelectron Spectroscopy (XPS)

Figure 10:
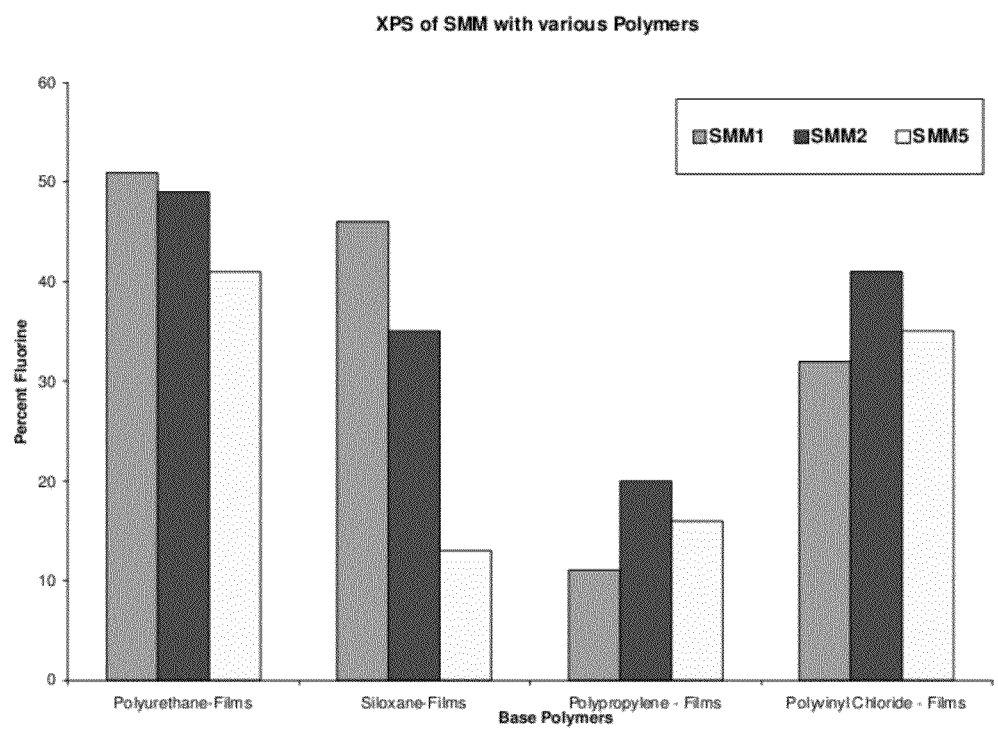
FIG. 10 is a plot showing the surface modification of various base polymers, e.g., polyurethane, siloxane, polypropylene, and polyvinyl chloride, when admixed with SMM and the percent fluorine on the surface of these polymers after XPS analysis.
Figure 11:
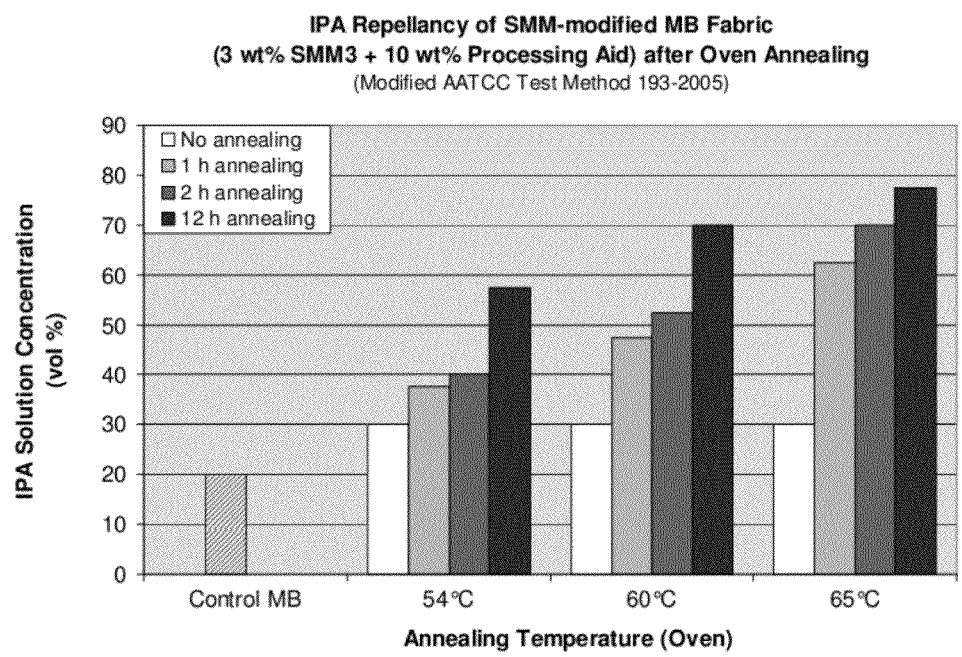

Carbothane™ (Thermedics Inc MA, USA), PE, and PP were used as control polymer and the base polymer. SMM admixtures prepared according to Example 2 were analyzed by XPS to determine the concentration of surface fluorine (hydrophobic) as well as the urethane chemistries (polar groups). The measurements were performed at a single take-off angle of 90° corresponding to a depth of 100 Å or at 20° corresponding to a depth of 10 Å, and a surface area of 4×7 mm² was analyzed. The films were investigated for relative atomic percentages of fluorine (F), oxygen (O), nitrogen, carbon (C), and silicon (Si). Only the results of atomic % of fluorine (F), the element of interest, for 3 different base polymers as modified with SMMs are provided as illustrations in Table 1 and in FIG. 10. The data illustrate that SMM are compatible with a wide range of base polymers used in the medical industry.

TABLE 1

Compatibility of various SMMs possessing different chemistries with various polymers

| Base Polymer | XPS, % Fluorine at 20° or 90° | | | | | |
|---|---|---|---|---|---|---|
| | SMM1 | SMM2 | SMM5 | SMM11 | SMM13 | SMM14 |
| Polyurethane Films | 51 | 49 | 41 | — | — | — |
| Siloxane Films | 46 | 35 | 13 | — | — | — |
| Polypropylene Films | 11 | 20 | 16 | — | — | — |
| Polyvinyl Chloride Extruded Rods | 32 | 41 | 35 | — | — | — |
| Polyamide (Nylon) Extruded rods | — | 19 | 15 | 11 | 12 | 11 |
| Polysulfone Hollow Fibers | — | 9 | — | — | — | — |

EXAMPLE 6

SMM Used in Nonwovens for Repellency (i) Repellency of SMM-Modified SMM Used in Meltblown Nonwoven Meltblown Fabric for Repellency.

Figure 11:
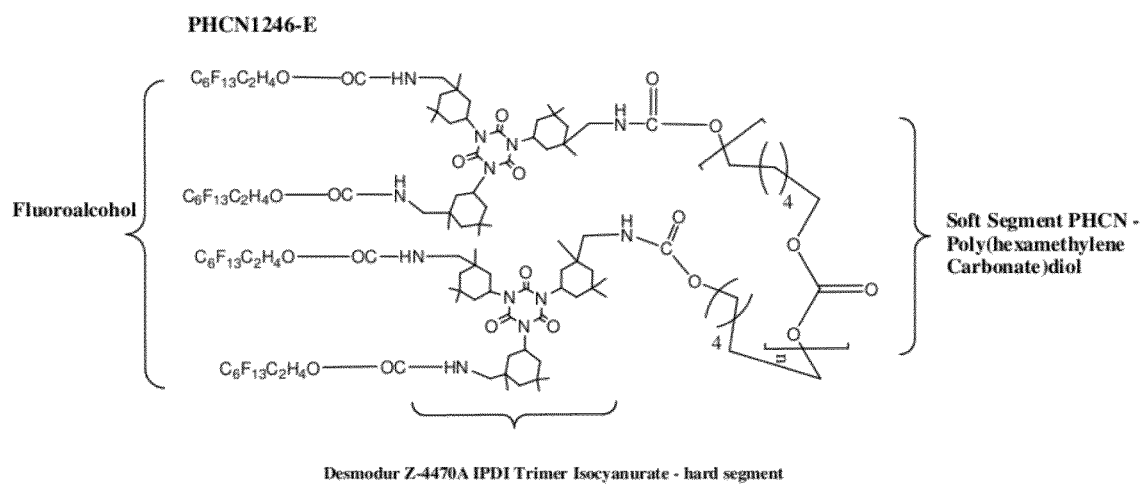
FIG. 11 shows the IPA repellency of surface-modified meltblown (MB) fabric as function of annealing time & temperature.
Figure 12:
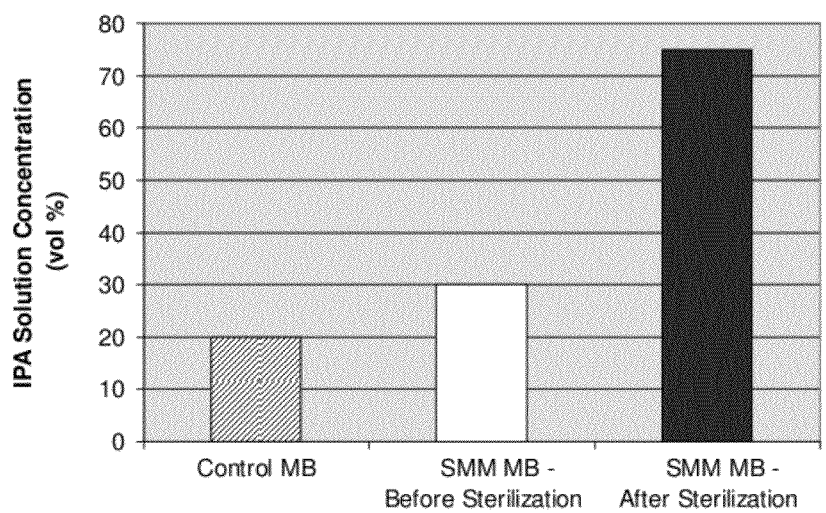
FIG. 12 shows the IPA repellency of surface modified MB fabric after a sterilization cycle.

SMMs were have been used in a meltblowing trial conducted on a 6" pilot line using meltblowing grade polypropylene (PP MF650X from Basell Polyolefins) with a MFI=1200 g/10 min (230° C./2.16 kg). First, the SMM additives were compounded into master batches and diluted to concentrations of 2-3 weight % in the meltblowing process. Processing aids (e.g., commercially available low-molecular weight hydrocarbon polymers) that can slow the crystallization rate of polypropylene were used at 10 wt % to promote migration of the SMM additives. Nonwoven fabric was obtained in the meltblowing process conducted at 260° C. with a throughput of 0.4 g/hole/min. The nonwoven fabric produced was soft in texture, with a basis weight of ~25 gsm and a fiber diameter of ~3 μm. Repellency tests using various concentrations of 70% isopropanol (IPA) solutions were conducted on the fabric immediately after it emerged from the meltblowing process line. The fabric was again tested after annealing at low temperatures in an air flow oven. The American Association of Textile Chemists and Colorists (AATCC) standard test method 193-2005 was used for repellency testing of the fabric, with the modification that solutions were prepared in volumetric concentrations instead of ratios. FIG. 11 shows that (MB) fabric coming off the process line had minimal repellency (30% IPA repellency) but the repellency increased dramatically after annealing at low temperatures (70% IPA repellency after annealing at 60° C. and >75% IPA repellency after annealing at 65° C. for 12 hours). After being subjected to a standard EtO sterilization cycle (54.4° C.), the meltblown fabric also showed repellency to 70% IPA solution (FIG. 12).

Figure 13:
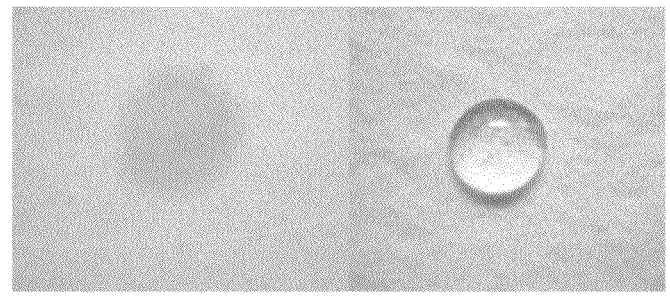
FIG. 13 illustrates the repellency of treated and untreated nonwoven fabric.

FIG. 13 illustrates the repellency of treated and untreated nonwoven fabric. The control fabric (polypropylene without SMM treatment) shows no repellency as indicated by the passage of a drop of 70% IPA (wetting) whereas the fabric on the right shows remarkable repellency indicated by the shape of the IPA droplet on the fabric without wetting. Heat exposure encountered during sterilization is sufficient to promote migration of SMM additives, with no additional annealing required.

Figure 14:
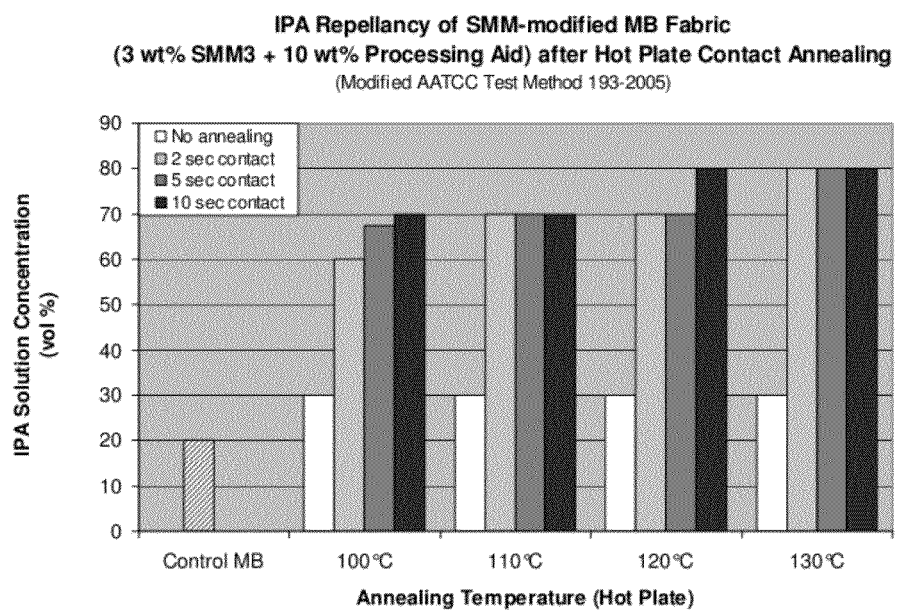
FIG. 14 illustrates repellency achieved on MB fabrics after brief, direct contact with hot plate surfaces at 100-130° C.

Furthermore, desired repellency of the fabric can also be achieved by brief contact exposure (2-10 seconds) to temperatures of 100-130° C. Fabrics for medical garments may experience such conditions during standard manufacturing processes, such as drying of anti-static treatments or calendar bonding of multilayer fabrics. FIG. 14 illustrates repellency achieved on MB fabrics after brief, direct contact with hot plate surfaces at 100-130° C.

(ii) Repellency of SMM-Modified Nonwoven Spunbond Fabric

SMMs were used in a spunbond (SB) trial conducted on R&D prototyping equipment set up to mimic conditions of a spunbond pilot line. Specifically, a small-scale extruder with 4 temperature zones was connected to a metering pump and a die with 68 spinnerette holes. The extruder was positioned on scaffolding above a guiding shaft that directed the extruded fibers into an attenuator gun supplied with high pressure air, which was used to stretch the extruded fibers. The attenuated fibers were deposited on a moving mesh in a random fashion. The nonwoven webs thus formed were not bonded.

The SMMs were compounded into spunbond grade polypropylene (PP 3155 from Exxon Mobil) with a MFI=36 g/10 min (230° C./2.16 kg) at concentrations of 1-2 wt % along with 5-10 wt % of a processing aid. The compounded resins were extruded into spunbond nonwoven webs using the R&D equipment at a process temperature of 230° C. at the die.

Figure 15:
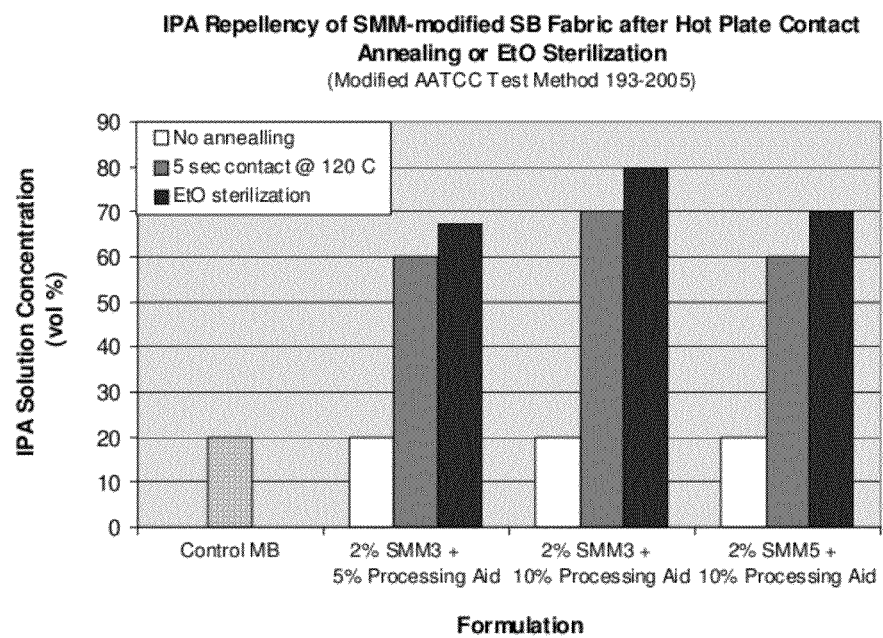
FIG. 15 shows repellency to alcohol solutions with concentrations as high as 80 vol % IPA can be achieved on spunbond fabrics modified with SMMs.

The spunbond webs were tested for repellency to IPA solutions after annealing by direct contact for 5 seconds with a heated surface at 120° C. or after EtO sterilization of the nonwoven webs in a standard cycle at 54.4° C. FIG. 15 shows repellency to alcohol solutions with concentrations as high as 80 vol % IPA can be achieved on spunbond fabrics modified with SMMs.

The results indicate the SMM synthesized have a very important utility in providing alcohol (70% IPA) repellency to nonwoven (meltblown or spunbond) fabric.

Other Embodiments

All publications, patents, and patent applications mentioned in this specification are herein incorporated by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

What is claimed is:

1. An admixture comprising a base polymer selected from polypropylene and polyurethanes admixed with a surface modifier having a structure according to

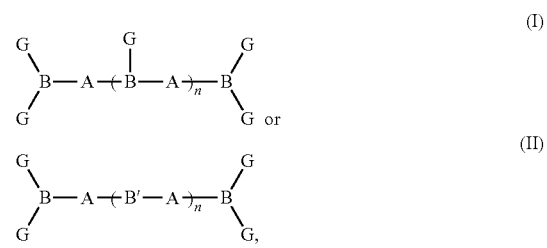

wherein
(i) A is a soft segment selected from poly(diethylene glycol)adipate (PEGA), polytetramethylene oxide (PTMO), poly(ethyleneglycol)-block-poly(propyleneglycol))- block-poly(ethylene glycol), or polydimethylsiloxane block copolymer (C22);
(ii) B is a hard segment comprising a urethane trimer or biuret trimer formed from hexamethylene diisocyanate (HDI) biuret trimer, isophorone diisocyanate (IPDI) trimer, or hexamethylene diisocyanate (HDI) trimer, and B', when present, is a hard segment comprising a urethane; and
(iii) each G is a surface active group comprising polyfluoroalkyls;
wherein n is an integer from 0 to 10;
and wherein (i) said surface modifier has a thermal degradation temperature of at least 200° C.; and (ii) said admixture is formed by mixing said surface modifier with said base polymer to form a mixture and annealing said mixture; and
wherein when the base polymer is polypropylene, A is a soft segment selected from polymethylsiloxane block copolymer (C22) and poly(ethyleneglycol)-block-poly (propyleneglycol)-block-poly(ethyleneglycol).

2. The admixture of claim 1, wherein said surface active group is selected from the group consisting of radicals of the general formula $CH_mF_{(3-m)}(CF_2)_rCH_2CH_2$— and $CH_mF_{(3-m)}(CF_2)_s(CH_2CH_2O)\chi$—, wherein
m is 0, 1, 2, or 3;
$\chi$ is an integer between 1-10;
r is an integer between 2-20; and
s is an integer between 1-20.

3. The admixture of claim 2, wherein m is 0 or 1.

4. The admixture of claim 1, wherein each surface active group is selected, independently, from $(CF_3)(CF_2)_5 CH_2CH_2O$—, $(CF_3)(CF_2)_7CH_2CH_2O$—, $CHF_2(CF_2)_3 CH_2O$—, and $(CF_3)(CF_2)_2CH_2O$—.

5. The admixture of claim 1, wherein said surface modifier has a theoretical molecular weight of less than 10,000 Daltons.

6. The admixture of claim 1, wherein A is poly(tetramethylene oxide) (PTMO).

7. The admixture of claim 1, wherein A is polydimethylsiloxane block copolymer.

8. The admixture of claim 7, wherein n is 0, and B is formed from hexamethylene diisocyanate (HDI) biuret trimer.

9. The admixture of claim 1, wherein A is formed from poly(ethyleneglycol)-block-poly(propyleneglycol))-block-poly(ethylene glycol).

10. The admixture of claim 9, wherein n is 0, and B is formed from isophorone diisocyanate (IPDI) trimer.

11. The admixture of claim 1, wherein A is poly(diethylene glycol)adipate (PEGA).

12. The admixture of claim 11, wherein n is 0, and B is formed from isophorone diisocyanate (IPDI) trimer.

13. The admixture of claim 1, wherein said base polymer is selected from polypropylene.

14. The admixture of claim 1, wherein said base polymer is selected from, polyurethanes.

15. The admixture of claim 1, wherein said admixture is melt processed prior to annealing.

16. An article comprising the admixture of claim 1.

17. The article of claim 16, wherein said article is a filter, film, fiber, sheet, or an implantable medical device.

18. The article of claim 17, wherein said implantable medical device is a cardiac-assist device, a catheter, a stent, a prosthetic implant, an artificial sphincter, or a drug delivery device.

19. The article of claim 16, wherein the base polymer is polypropylene.

20. The article of claim 16, wherein said article is a hollow fiber membrane.

21. The article of claim 16, wherein said article is a filter.

22. The article of claim 16, wherein said article is a tube.

23. The article of claim 16, wherein said article is a conduit.

24. The article of claim 16, wherein said article is formed from an admixture that is melt-processed.

25. The article of claim 24, wherein said admixture is molded, melt blown, melt spun, or melt extruded.

26. The article of claim 16, wherein the base polymer is selected from polyurethanes.

27. The admixture of claim 1, wherein n is 0, A is poly(tetramethylene oxide)(PTMO), B is formed from hexamethylene diisocyanate (HDI) biuret trimer, and said base polymer is a polyurethane.

28. The admixture of claim 1, wherein n is 0, A is polydimethylsiloxane block copolymer, B is formed from hexamethylene diisocyanate (HDI) biuret trimer, and said base polymer is polypropylene.

* * * * *

UNITED STATES PATENT AND TRADEMARK OFFICE
CERTIFICATE OF CORRECTION

PATENT NO. : 8,318,867 B2
APPLICATION NO. : 13/323427
DATED : November 27, 2012
INVENTOR(S) : Sanjoy Mullick et al.

It is certified that error appears in the above-identified patent and that said Letters Patent is hereby corrected as shown below:

In the Specification

Column 1, Lines 47-48, replace "(e.g., workers overalls, facemasks, and labcoats among others)." with --(e.g., workers' overalls, facemasks, and lab coats among others).--.

Column 1, Line 55, replace "thermally s' additives" with --thermal additives--.

Column 2, Line 32, replace "or even 350°C." with --or even 450°C.--.

Column 4, Line 67, replace "or even 350°C." with --or even 450°C.--.

Column 11, Line 46, begin new paragraph between "(NeoBi 200, Shepherd Chemicals)." and "The soft segment".

Signed and Sealed this
Seventeenth Day of June, 2014

Michelle K. Lee
*Deputy Director of the United States Patent and Trademark Office*

CERTIFICATE OF CORRECTION (continued)
U.S. Pat. No. 8,318,867 B2

Column 17, Scheme 2, replace

"

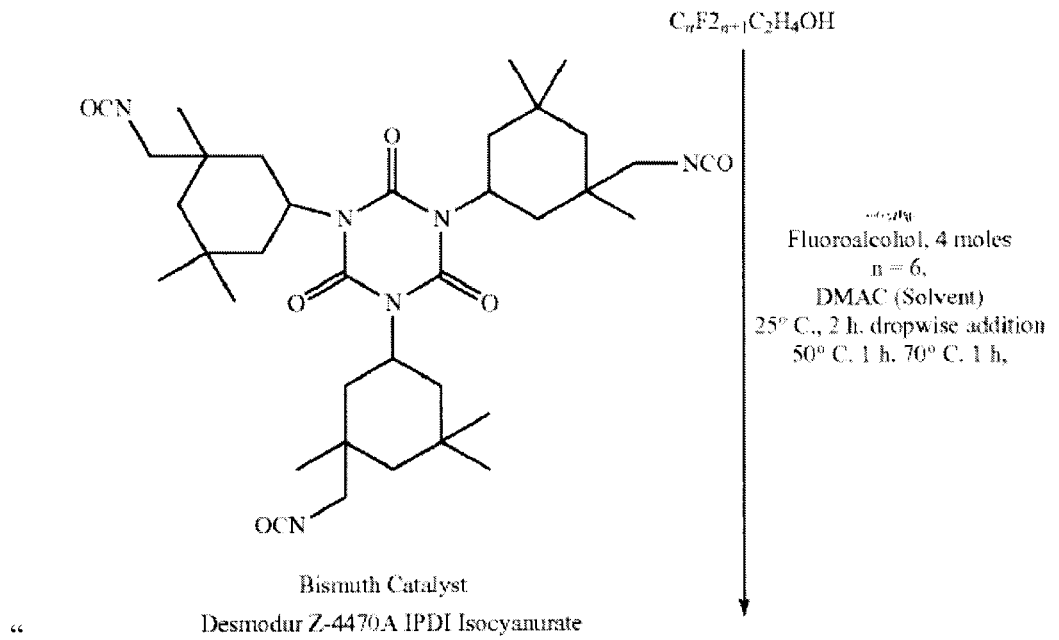

"

with --

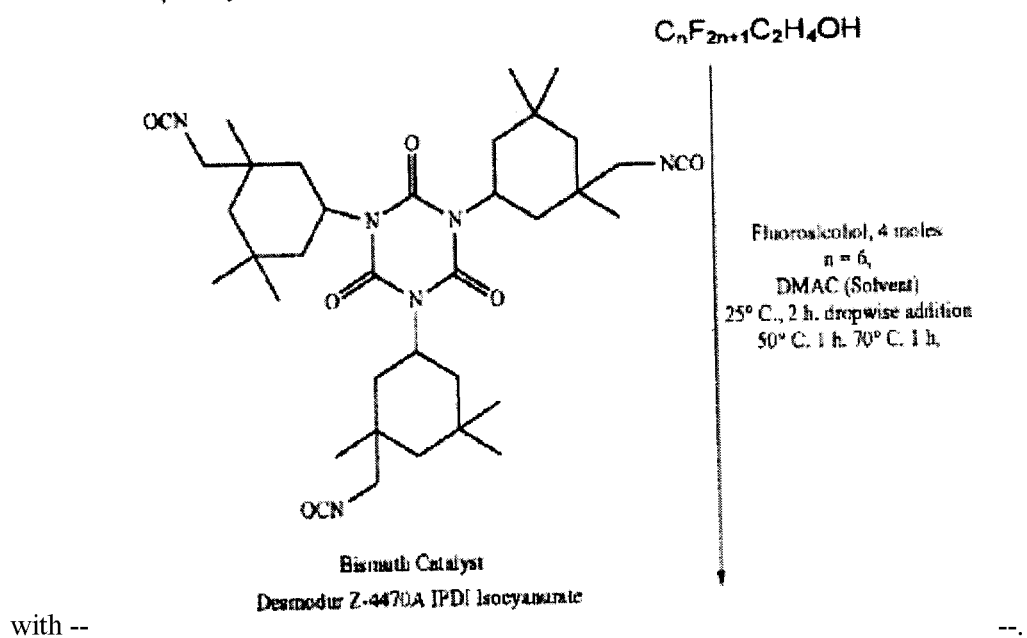

--.

Column 20, Line 34, replace "slowly pored into" with --slowly poured into--.

Column 21, Line 1, replace "placed into 1004," with --placed into 100 L--;

Lines 40-41, replace "(Knoxyille, Tenn.) with --(Knoxville, Tenn.)--.

Column 23, Line 19, replace "die with" with --dye with--.